United States Patent [19]
Yamauchi et al.

[11] Patent Number: 5,267,755
[45] Date of Patent: Dec. 7, 1993

[54] HEAT TRANSFER RECORDING MEDIA

[75] Inventors: Mineo Yamauchi; Katsuyuki Oshima; Jitsuhiko Ando; Masanori Torii; Hideo Fujimura; Tamami Iwata, all of Tokyo, Japan

[73] Assignee: Dai Nippon Insatsu Kabushiki Kaisha, Japan

[21] Appl. No.: 582,216

[22] PCT Filed: Jan. 30, 1990

[86] PCT No.: PCT/JP90/00109
§ 371 Date: Oct. 1, 1990
§ 102(e) Date: Oct. 1, 1990

[87] PCT Pub. No.: WO90/08661
PCT Pub. Date: Aug. 9, 1990

[30] Foreign Application Priority Data

| Jan. 31, 1989 | [JP] | Japan | 1-22346 |
| Feb. 13, 1989 | [JP] | Japan | 1-33455 |
| Feb. 13, 1989 | [JP] | Japan | 1-33456 |
| Nov. 20, 1989 | [JP] | Japan | 1-299774 |
| Nov. 20, 1989 | [JP] | Japan | 1-299775 |
| Nov. 20, 1989 | [JP] | Japan | 1-299776 |
| Nov. 27, 1989 | [JP] | Japan | 1-304844 |
| Nov. 27, 1989 | [JP] | Japan | 1-304845 |

[51] Int. Cl.⁵ .................................................. B42D 15/00
[52] U.S. Cl. .................................. 283/86; 283/109
[58] Field of Search .................... 283/86, 85, 87, 91, 283/94, 101, 107, 109, 110, 901, 904

[56] References Cited

U.S. PATENT DOCUMENTS

| 3,552,853 | 1/1971 | Sanders et al. | 283/86 X |
| 4,171,864 | 10/1979 | Jung et al. | 283/86 X |
| 4,971,646 | 11/1990 | Schell et al. | 283/86 X |
| 5,010,243 | 4/1991 | Fukushima et al. | 283/86 X |

FOREIGN PATENT DOCUMENTS

| 285390 | 11/1989 | Japan . |
| 134300 | 5/1990 | Japan . |
| 212193 | 8/1990 | Japan . |

Primary Examiner—Mark Rosenbaum
Assistant Examiner—Willmon Fridie, Jr.
Attorney, Agent, or Firm—Parkhurst, Wendel & Rossi

[57] ABSTRACT

The present invention relates to a heat transfer recording medium in which a substrate items of information such as an image and characters formed on a surface thereof by heat transfer and a transparent protective layer is provided on at least a part of the surface of the thus recorded information through an adhesive layer, if required, characterized in that the adhesive layer and/or protective layer function to provide security against counterfeiting. Combining information recorded by heat transfer with a function to provide security against counterfeiting, the present invention provides greater security against falsifying or counterfeiting.

12 Claims, 8 Drawing Sheets

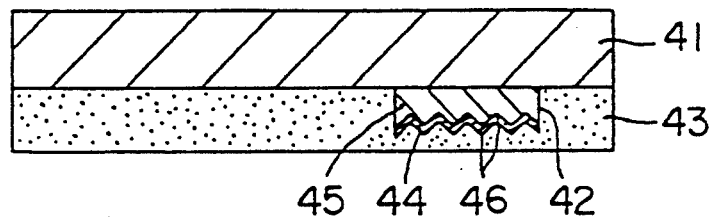
F I G. 25
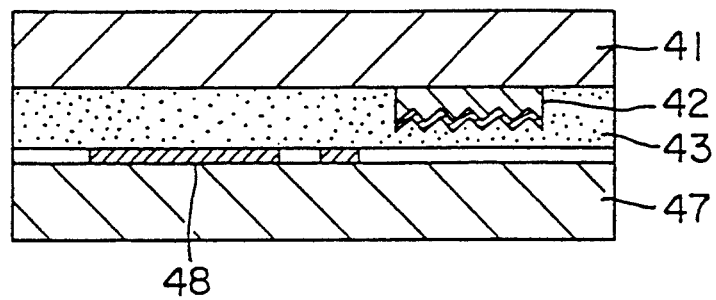
F I G. 26
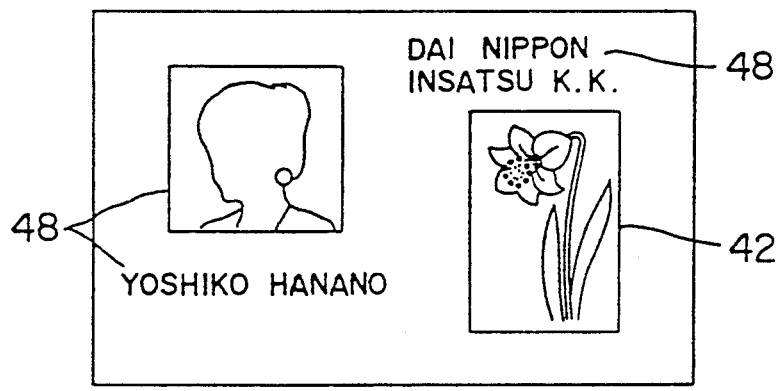
F I G. 27

HEAT TRANSFER RECORDING MEDIA

TECHNICAL FIELD

The present invention relates to a recording medium and, more particularly, to a heat transfer recording medium which is preferably used as an identification card, etc. and provides greater security against counterfeiting and falsifying.

BACKGROUND OF THE INVENTION

Conventionally, many types of cards such as identification cards, driving licences and membership cards carry thereon various items of information to provide a disclosure of what the bearers are. Of the most importance for ID cards in particular are literal information such as name and address and a photographic image of face.

One classical technique for applying a photograph of face to each of various cards involves bonding it to a given region of the card with an adhesive. Problems with this technique are that it is very laborious; it makes the surface of the card uneven and so rids it of flatness; and it allows the card to be easily counterfeited or falsified by the replacement of another photograph of face.

In order to solve the defect of such an old technique as mentioned above, there has been developed a sublimation transfer type of imaging technique.

According to this heat transfer technique, a sublimation type of heat transfer sheet formed by providing onto the surface of a substrate film a layer containing a dye sublimable and transferable by heat is overlaid on a card substrate., and the assembly is heated from the back side of the sublimation transfer sheet with a thermal head to reproduce a photograph of face on the card substrate simultaneously with printing of various letters, characters and so on. Alternatively, these characters may be printed in a hot meltable ink type of heat transfer manner. In either case, this technique has the advantage of being able to be carried out with a simple thermal printer. Since various items of information obtained by the above heat transfer technique are less than satisfactory in terms of such properties as rub resistance, however, the surface of the photograph, etc. is generally provided with a transparent surface protecting layer excelling in such properties as rub resistance.

Especially because the photograph is formed by fixing the dye in the card substrate, the card obtained by the above technique is of improved flatness and provides greater security against falsifying and counterfeiting. Even with this technique, however, there is a little fear that the photograph and other information may be falsified or counterfeited by removing the protecting layer by solvents, acids, bases or the like.

DISCLOSURE OF THE INVENTION

It is accordingly an object of the present invention to provide a heat transfer recording medium best-suited for making ID cards, etc. to which greater security against counterfeiting and falsifying is imparted.

This object is attainable by the present invention set forth below.

More specifically, the present invention relates to a heat transfer recording medium characterized in that some items of information such as a photograph of face and characters are carried on the surface of a substrate by heat transfer and a transparent protective layer is provided on at least a part of the information through an adhesive layer, if required, said adhesive layer and/or protective layer functioning to provide security against counterfeiting.

On or in the adhesive or protective layer of the card providing a coating to various items of information, there is formed a safe-from-counterfeiting layer comprising a design or other marking, which does not substantially conceal the above information, thereby making it difficult for forgers to reconstruct the design or other marking when they intend to falsify or counterfeit the photograph, etc. Thus, falsifying or counterfeiting, if attempted, can immediately be found out, making it difficult to falsify or counterfeit the card.

BRIEF DESCRIPTION OF THE DRAWINGS

FIGS. 11, 12 and 27 are each a plan view illustrating a preferred embodiment of the present invention.

BEST MODE FOR CARRYING OUT THE INVENTION

Figure 1:
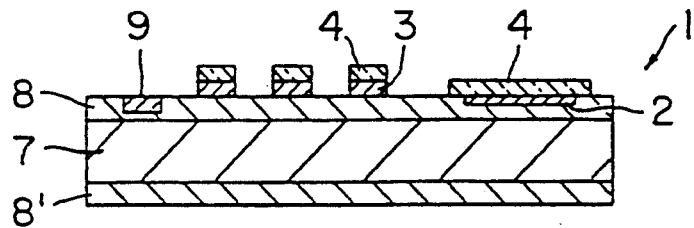
FIGS. 1 through 10; 13 through 26; and 28 through 31 are each a sectional view illustrating a preferred embodiment of the present invention.

The present invention will first be explained generally with reference to the preferred aspects.

Aspect 1

The recording medium of the present invention will now be explained with reference to the first aspect in which it is applied to a card. As diagrammatically shown in the sectional view of FIG. 1, some items of information such as a photograph of face 2 and characters 3 are carried on the surface of a card substrate 1 and a transparent protective layer 4 is provided on at least a part of the information, thereby making a card. This card is characterized in that the protective layer 4 is provided thereon or therein with a design 5 (see FIGS. 2 to 4) which does not substantially conceal the information.

Figure 2:
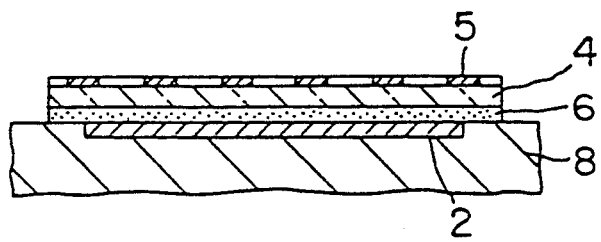

FIG. 2 is a diagrammatic illustration showing the section of one embodiment of the card according to the first aspect of this invention. In this embodiment, the design 5 is formed on the surface of the protective layer 4. In another example shown in FIG. 3, the pattern 5 is formed between the protective layer 4 and an adhesive layer 6. In yet another embodiment shown in FIG. 4, there is provided the design 5 between two protective layers 4 and 4'.

As long as it is provided on its surface with a dye receiving layer dyeable with a sublimable dye, the card substrate 1 used for the card of the present invention may be formed of any known material. For instance, use may be made of films or sheets of various plastics such as polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added. Use may further be made of synthetic paper (based on polyolefin, polystyrene, etc.), fine paper, art or coated paper, cast coated paper, wall paper, lining paper, synthetic resin or emulsion-impregnated paper, synthetic rubber latex-impregnated paper, synthetic resin-incorporated paper, paperboard, cellulose fiber paper or the like.

Still further, laminates comprising any desired combination of the above substrate films may be used to this end.

FIG. 1 is one preferable embodiment of the card substrate 1 according to the first aspect of the invention, which comprises a center core 7 formed of polyvinyl chloride containing a white pigment and transparent polyvinyl chloride layers 8 and 8' laminated on both sides of the core 7. At least the transparent polyvinyl chloride layer 8, defining a imaging surface, contains a suitable amount of a plasticizer to make better the fixability of a dye.

The quantity of the plasticizer incorporated is in a range of preferably 0.1 to 10 parts by weight, more preferably 3 to 5 parts by weight per 100 parts by weight of polyvinyl chloride forming the dye receiving layer 8. Too small a quantity of the plasticizer, on the one hand, makes its fixability with respect to the sublimable dye so insufficient that abnormal transfer can occur in which the dye layer of the heat transfer sheet is transferred as such during heat transfer. Too large an amount of the plasticizer, on the other hand, reduces and softens the dye receiving surface and causes the printed image to be blotted and so become unclear during storage.

Optionally, the above dye receiving layer 8 may contain any desired additives such as coloring pigments, white pigments, body pigments, fillers, UV absorbers, antistatics, thermal stabilizers and fluorescent brighteners.

The card substrate 1 may be pre-formed on its surface with the required magnetic recording layer 9 and, although not illustrated, an embossed or printed pattern, an optical or IC memory, a bar code and so on. Alternatively, it may be provided with them by heat transfer or other systems after the carrying of such information as the photograph.

The photograph 2 to be carried on the card substrate 1 may be formed with a known sublimation type of heat transfer sheet in conventional manners. Simultaneously with this, literal or other information 3 may be formed with a sublimation type of heat transfer sheet. However, it is preferred that the literal information 3 is formed with a hot melting ink type of heat transfer sheet enabling black letters and characters to be printed at high density. Although it is understood that the photographic information 2 and literal information 3 may be formed with separate heat transfer sheets, more advantageous in view of process efficiency is that both types of information are formed simultaneously with a composite heat transfer sheet including a sublimable dye layer together with a meltable ink layer.

The lamination of the protective layer 4 for improving the service life or durability of the recorded information, e.g., the photograph of face, may be achieved by coating and drying a transparent coating material, laminating a transparent film and using a protective layer/heat transfer sheet. The protective layer 4 may be provided over, or on a part of, the recorded information at a step separate from the step of recording each type of information. In a preferred embodiment of the first aspect of the invention, however, use is made of a composite heat transfer sheet in which the substrate film is provided thereon with a sublimable dye layer of at least one color, a hot meltable ink layer of at least one color and a protective layer in that order, thereby simultaneously forming a gradient image such as a photograph of face and a landscape, a monotonous image such as characters and markings and the transparent protective layer with the same heat transfer sheet.

In order to improve further the safe-from-falsifying-/counterfeiting-properties of such a card as mentioned above, the first aspect of the invention is further characterized in that the protective layer is provided thereon or therein with a design which does not substantially conceal the above information.

The above design is preferably located adjacent to at least the protective layer, as mentioned above, and may be any desired one, as long as it does not conceal the recorded information covered thereby. Specifically but not exclusively, it may be defined by company logos, symbol marks, landscapes, abstract pictures, background pattern and holograms. In n alternative embodiment, it may be a uniform transparent colored layer or a uniform layer having the functions to be described later. In the present disclosure, therefore, these uniform layers are also referred to as the "design" for reasons of expediency.

One design, which can be visually observed without concealing the recorded information, may be formed at relatively low density with pigments, dyes, fluorescent dyes, etc. all of high transparency. Another design, which cannot be visually distinguished but can be done through infrared, ultraviolet or other rays, may be formed with infrared absorbers, ultraviolet absorbers, fluorescent brighteners, etc. Yet another design may be formed with a coloring matter which develops colors by contacting oxygen (an oxygen indicator). In this case, the design comes out by destroying the protective layer inside which it is located.

Preferably, the design should be formed by any one of suitable forming methods selected depending upon how to form the protective layer. When the protective layer is formed by film lamination by way of example, the desired design may be pre-printed on the film with ink containing such design forming agents as already mentioned. In an alternative embodiment wherein the protective film is formed by coating, it is provided on its surface with the desired design after it has been formed.

In the present invention, the design should preferably formed by a heat transfer technique. In other words, it is extremely advantageous in view of process efficiency to use such a protective layer/heat transfer sheet combinations as illustrated in FIG. 5-7 by way of example, since the design can then be imparted simultaneously with the formation of the protective layer.

Figure 5:
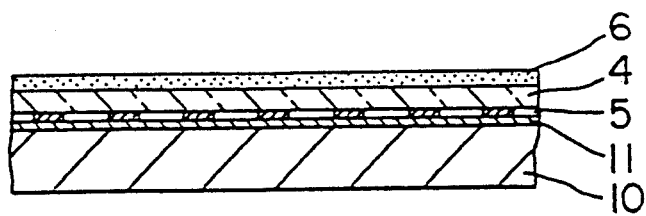

In the protective layer/heat transfer sheet combination illustrated in FIG. 5, a substrate film 10 is provided on its surface with a release layer 11 at need, on which the design 5, protective layer 4 and adhesive layer 6 are formed in that order. This is then transferred onto the surface of the information recorded in the card by the heat transfer technique, whereby the card shown in FIG. 2 is provided.

Figure 3:
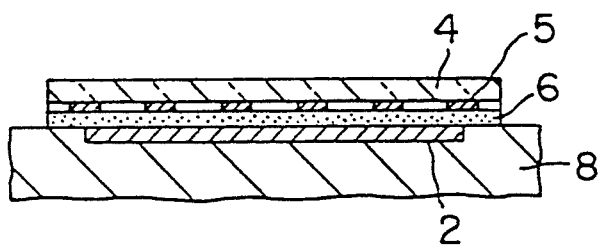
Figure 6:
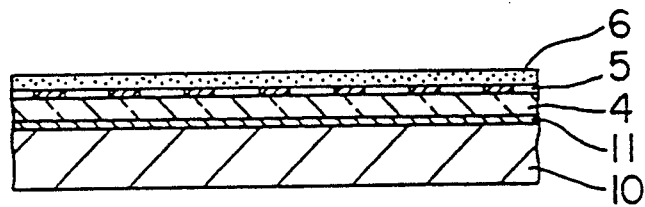

In the protective layer/heat transfer sheet combination shown in FIG. 6, a substrate film 10 is provided on its surface with a release layer 11 at need, on which the protective layer 4, design layer 5 and adhesive layer 6 are formed in that order. This is then transferred onto the surface of the information recorded in the card by the heat transfer technique, whereby the card shown in FIG. 3 is provided.

Figure 4:
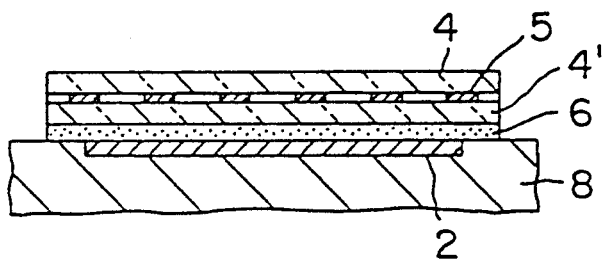
Figure 7:
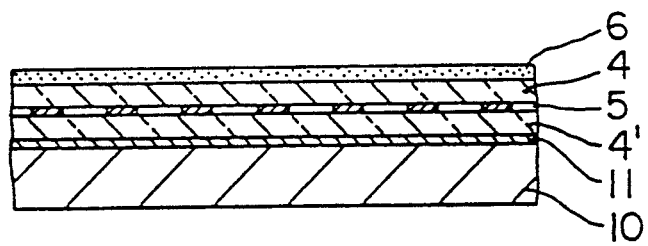

In the protective layer/heat transfer sheet combination shown in FIG. 7, a substrate film 10 is provided on its surface with a release layer 11 at need, on which the protective layer 4', design layer 5, protective layer 4 and adhesive layer 6 are formed in that order. This is then transferred onto the surface of the information recorded in the card by the heat transfer technique, whereby the card shown in FIG. 4 is provided.

According to the present invention as set forth in the foregoing, on or in the protective layer of the card providing a coating to various items of information, there is formed the design which does not substantially conceal the above information, thereby making it difficult for forgers to reconstruct the pattern when they intend to falsify or counterfeit the photograph, etc. Thus, falsifying or counterfeiting, if attempted, can immediately be found out, making it difficult to falsify or counterfeit the card.

Aspect 2

The second aspect of the present invention relates to a card characterized in that some items of information such as a photograph of face and characters are carried on the surface of a card substrate and a transparent protective layer is formed on at least a part of the information through an adhesive layer, if required, said adhesive and/or protective layers containing a photosensitive material which does not substantially conceal the information.

Inside the adhesive and/or protective layers of the card providing a coating to various items of information, there is included the photosensitive material which does not substantially conceal the above information, thereby making it difficult for forgers to reconstruct the adhesive and/or protective layers when they intend to falsify or counterfeit the photograph, etc. Thus, falsifying or counterfeiting, if attempted, can immediately be found out, making it difficult to falsify or counterfeit the card.

As described in connection with FIG. 8, the second aspect of the present invention provides a card characterized in that some items of information such as a photograph of face 2 and characters 3 are formed on the surface of a card substrate 1 and a transparent protective layer 4 is provided on at least a part of the information through an adhesive layer 6, if required, said adhesive and/or protective layers 6 and 4 containing therein a photosensitive material which does not substantially conceal the information.

As long as it is provided on its surface with a dye receiving layer dyeable with a sublimable dye, the card substrate used for the card according to the second aspect of the present invention may be formed of any known material. For instance, use may be made of films or sheets of various plastics such as polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added. Use may further be made of synthetic paper (based on polyolefin, polystyrene, etc.), fine paper, art or coated paper, cast coated paper, wall paper, lining paper, synthetic resin or emulsion-impregnated paper, synthetic rubber latex-impregnated paper, synthetic resin-incorporated paper, paperboard, cellulose fiber paper or the like.

Still further, laminates comprising any desired combination of the above substrate films may be used to this end.

Figure 8:
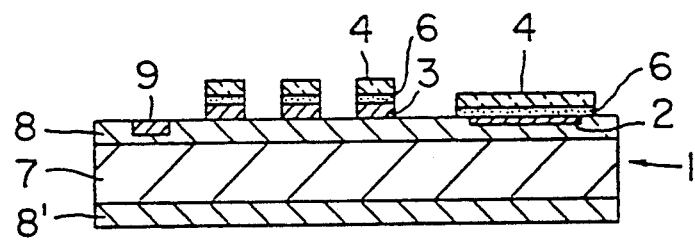

FIG. 8 is one preferable embodiment of the card substrate 1 according to the instant aspect, which comprises a center core 7 formed of polyvinyl chloride containing a white pigment and transparent polyvinyl chloride layers 8 and 8' laminated on both sides of the core 7. At least the transparent polyvinyl chloride layer 8, defining an imaging surface, contains a suitable amount of a plasticizer to make better the fixability of a dye.

The quantity of the plasticizer incorporated is in a range of preferably 0.1 to 10 parts by weight, more preferably 3 to 5 parts by weight per 100 parts by weight of polyvinyl chloride forming the dye receiving layer 8. Too small a quantity of the plasticizer, on the one hand, makes its fixability with respect to the sublimable dye so insufficient that abnormal transfer can occur in which the dye layer of the heat transfer sheet is transferred as such during heat transfer. Too large an amount of the plasticizer, on the other hand, reduces and softens the dye receiving surface and causes the printed image to be blotted and so become unclear during storage.

Optionally, the above dye receiving layer 8 may contain any desired additives such as coloring pigments, white pigments, body pigments, fillers, UV absorbers, antistatics, thermal stabilizers and fluorescent brighteners.

The card substrate 1 may be pre-formed on its surface with the required magnetic recording layer 9 and, although not illustrated, an embossed or printed pattern, an optical or IC memory, a bar code and so on. Alternatively, it may be provided with them by heat transfer or other systems after the carrying of such information as the photograph of face.

The photograph 2 to be carried on the card substrate 1 may be formed with a known sublimation type of heat transfer sheet in conventional manner. Simultaneously with this, literal or other information 3 may be formed with a sublimation type of heat transfer sheet. However, it is preferred that the literal information 3 is formed with a hot melting ink type of heat transfer sheet enabling black letters and characters to be printed at high density. Although it is understood that the photographic information 2 and literal information 3 may be formed with separate heat transfer sheets, more advantageous in view of process efficiency is that both types of information are formed simultaneously with a composite heat transfer sheet including a sublimable dye layer together with a meltable ink layer.

The lamination of the protective layer 4 for improving the service life or durability of the recorded information, e.g., the photograph of face, may be achieved by coating and drying a transparent coating material, laminating a transparent film and using a protective layer/heat transfer sheet. The protective layer 4 may be provided over, or on a part of, the recorded information at a step separate from the step of recording each type of information. In a preferred embodiment of the second aspect of the invention, however, use is made of a composite heat transfer sheet in which the substrate film is provided thereon with a sublimable dye layer of at least one color, a hot meltable ink layer of at least one color and a protective layer in that order, thereby simultaneously forming a gradient image such as a photograph of face and a landscape, a monotonous image such as characters and markings and the transparent protective layer with the same heat transfer sheet.

In order to improve further the safe-from-falsifying-/counterfeiting-properties of such a card as mentioned above, the the present invention is further characterized in that the adhesive layer 6 and/or protective layer 4 are provided therein with a photosensitive material which does not substantially conceal the above information.

By way of example, one type of photosensitive materials unlikely to conceal the recorded information may be generally available coloring materials of increased transparency, which can be visually observed through visible light, such as pigments, dyes and fluorescent brighteners, and may be incorporated into the adhesive layer and/or protective layer at relatively low concentration. Another type of photosensitive materials, which cannot be distinguished visually but can be done through infrared rays, ultraviolet rays or other rays, may include infrared absorbers, ultraviolet absorbers, fluorescent brighteners and so on.

Preferably, the adhesive and/or protective layers containing the above photosensitive material should be formed by any one of suitable forming methods selected depending upon how to form the protective layer. When the protective layer is formed by film lamination by way of example, the photosensitive material may be preincluded in that film or the adhesive layer formed on its side. In an alternative embodiment wherein the protective film is formed by coating, the photosensitive material may be pre-included in the coating material used to this end.

Figure 9:
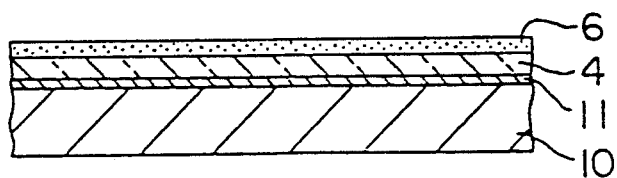

In the second aspect of the invention, the protective layer should preferably be formed by a heat transfer technique. In other words, it is extremely advantageous in view of process efficiency to pre-incorporate the photosensitive material into the adhesive layer 6 and/or protective layer 4 of such a protective layer/heat transfer sheet combination as shown in FIG. 9 by way of example, since the layer 6 and/or 4 can then be formed on the surface of such information as the photograph 2 carried on the card.

According to the second aspect of the invention as set forth in the foregoing, in the adhesive and/or protective layers of the card providing a coating to various items of information, there is formed the photosensitive material substantially unlikely to conceal the above information, thereby making it difficult for forgers to reconstruct the photograph and other information when they intend to falsify or counterfeit them. Thus, falsifying or counterfeiting, if attempted, can immediately be found out, making it difficult to falsify or counterfeit the card.

Aspect 3

The third aspect of the present invention relates to a card characterized in that some items of information such as a photograph of face and characters are carried on the surface of a card substrate and a transparent protective layer is formed on at least a part of the information, said protective layer being in the form of an uneven layer.

Rather positively making the protective layer of the card providing a coating to some items of information take on an uneven form renders it difficult for forgers to reconstruct such an uneven form when they intend to falsify or forge the photograph, etc. Thus, falsifying or forging, if attempted, can immediately be found out, making it difficult to falsify or forge the card.

Figure 10:
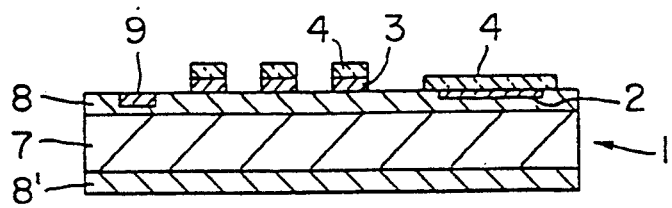

As diagrammatically shown in the sectional view of FIG. 10, the card according to this aspect is characterized in that some items of information such as a photograph of face 2 and characters 3 are carried on the surface of a card substrate 1 and a transparent protective layer 4 is formed on at least a part of the information, said protective layer being in the form of an uneven layer.

Figure 11:
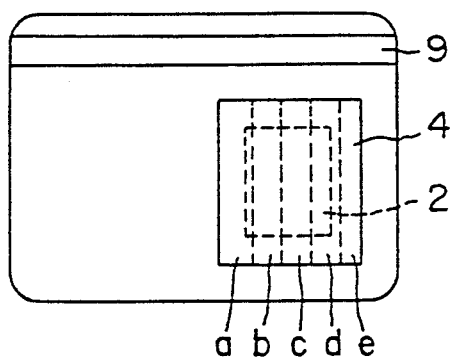

FIG. 11 is a diagrammatical illustration of the flat surface of one embodiment of the card according to this aspect, in which there is a difference in the surface gloss of the protective layer 4. For instance, the surface glossiness decreases in the order of a, b, c, d, and e.

Figure 12:
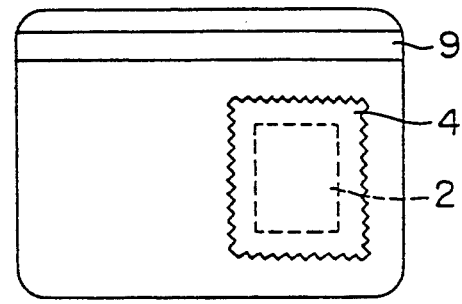

In another embodiment shown in FIG. 12, the protective layer 4, for instance, is notched along its profile.

Figure 13:
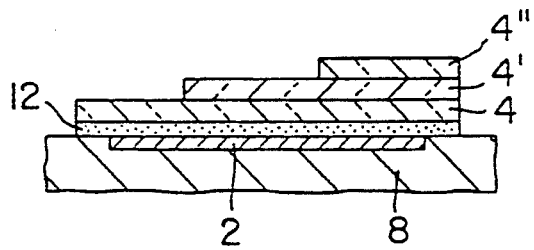

In yet another embodiment shown in FIG. 13, three protective layers are laminated together in such a way that their total thickness varies in section. In the instant aspect, the protective layers 4, 4' and 4" may all be transparent and colored differently with one another.

Figure 14:
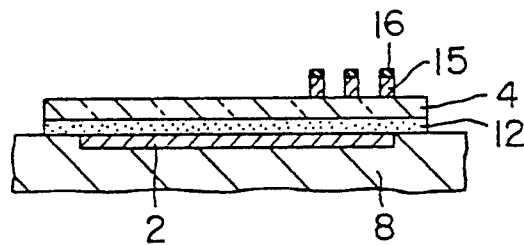

In still another embodiment shown in FIG. 14, the protective layer 14 is provided on its surface with minuscule projections 15 by embossing, which may optionally be colored on their tops 16.

As long as it is provided on its surface with a dye receiving layer dyeable with a sublimable dye, the card substrate used for the third aspect of the present invention may be formed of any known material. For instance, use may be made of films or sheets of various plastics such as polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added. Use may further be made of synthetic paper (based on polyolefin, polystyrene, etc.), fine paper, art or coated paper, cast coated paper,, wall paper, lining paper, synthetic resin or emulsion-impregnated paper, synthetic rubber latex-impregnated paper, synthetic resin-incorporated paper, paperboard, cellulose fiber paper or the like.

Still further, laminates comprising any desired combination of the above substrate films may be used to this end.

FIG. 10 is one preferable embodiment of the card substrate 1 according to the third aspect of the invention, which comprises a center core 7 formed of polyvinyl chloride containing a white pigment and transparent polyvinyl chloride layers 8 and 8' laminated on both sides of the core 7. At least the transparent polyvinyl chloride layer 8, defining an imaging surface, contains a suitable amount of a plasticizer to make better the fixability of a dye.

The quantity of the plasticizer incorporated is in a range of preferably 0.1 to 10 parts by weight, more preferably 3 to 5 parts by weight per 100 parts by weight of polyvinyl chloride forming the dye receiving layer 8. Too small a quantity of the plasticizer, on the one hand, makes its fixability with respect to the sublimable dye so insufficient that abnormal transfer can occur in which the dye layer of the heat transfer sheet is transferred as such during heat transfer. Too large an amount of the plasticizer, on the other hand, reduces and softens the dye receiving surface and causes the printed image to be blotted and become unclear during storage.

Optionally, the above dye receiving layer 8 may contain any desired additives such as coloring pigments, white pigments, body pigments, fillers, UV absorbers, antistatics, thermal stabilizers and fluorescent brighteners.

The card substrate 1 may be pre-formed on its surface with the required magnetic recording layer 9 and, although not illustrated, an embossed or printed pattern, an optical or IC memory a bar code and so on. Alternatively, it may be provided with them by heat transfer or other systems after the carrying of such information as the photograph of face.

The photograph 2 to be carried on the card substrate 1 may be formed with a known sublimation type of heat transfer sheet in conventional manners. Simultaneously with this, literal or other information 3 may be formed with a sublimation type of heat transfer sheet. However, it is preferred that the literal information 3 is formed with a hot melting ink type of heat transfer sheet enabling black letters and characters to be printed at high density. Although it is understood that the photographic information 2 and literal information 3 may be formed with separate heat transfer sheets, more advantageous in view of process efficiency is that both types of information are formed simultaneously with a composite heat transfer sheet including a sublimable dye layer together with a meltable ink layer.

The lamination of the protective layer 4 for improving the service life or durability of the recorded information, e.g., the photograph of face, may be achieved by coating and drying a transparent coating material, laminating a transparent film and using a protective layer/heat transfer sheet. The protective layer 4 may be provided over, or on a part of, the recorded information at a step separate from the step of recording each type of information. In a preferred embodiment of this aspect, however, use is made of a composite heat transfer sheet in which the substrate film is provided thereon with a sublimable dye layer of at least one color, a hot-meltable ink layer of at least one color and a protective layer in that order, thereby simultaneously forming a gradient image such as photograph of face and a landscape, a monotonous image such as characters and markings and the transparent protective layer with the same heat transfer sheet.

In order to improve further the safe-from-falsifying-/counterfeiting-properties of such a card as mentioned above, the third aspect of the present invention is characterized in that the protective layer is rather positively formed into an uneven layer.

The protective layer may be in various desired forms inclusive of the above mentioned ones. In what follows, explanation will be made typically with reference to the forms already mentioned.

(1) Uneven Gloss

When the protective layer is formed with a thermal head in heat transfer fashion, the surface glossiness luster may be varied incrementally in any desired form, as illustrated in FIG. 11, by varying the energy to be applied at suitable intervals or successively. Optionally, the surface glossiness may then be varied following various designs.

(2) Uneven Profile

When the protective layer is transferred with a thermal head, it may be notched along its profile, as illustrated in FIG. 12 by way of example. Alternatively, for the same purpose it may be hot stamped with a mold having notches along its profile.

(3) Uneven Thickness

As illustrated in FIG. 13, a plurality of protective layers varying in area may be transferred separately to vary their total thickness. As already mentioned, the protective layers may all be transparent and colored differently with one another. To this end, transparent pigments and dyes may be used. Furthermore, fluorescent brighteners, ultraviolet absorbers, infrared absorbers, etc. may be incorporated into each protective layer.

Although the difference in colors cannot visually be observed, for instance, it may be clearly distinguishable under black light or with an infrared detector, etc.

(4) Uneven Surface State

As illustrated in FIG. 14 by way of example, the protective layer 4, once formed, may again be locally provided on its surface with minuscule projections 15 by transfer. For the same purpose, the card may be embossed as a whole. The projections 15 may further be colored on their tops 16 to make it more difficult to falsify or counterfeit the card.

Preferably, the uneven protective layer according to the third aspect of the present invention should be formed by a heat transfer technique. By way of example, the protective layer showing such desired unevenness as mentioned above can easily be formed by using such a protective layer/heat transfer sheet combination as illustrated in FIG. 15.

Figure 15:
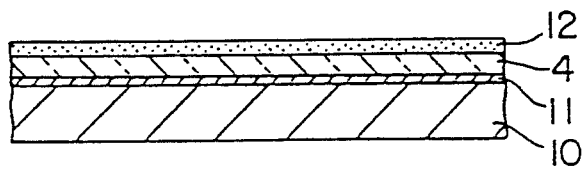

The card shown in FIG. 15 comprises: a substrate film 10, a release layer 11 provided on the surface of the film 10, if required, and a protective layer 4 and an adhesive layer 12 provided thereon, the protective layer/heat transfer sheet shown in FIG. 15 is transferred onto the information carrier surface of the card, whereby such a card as shown in FIG. 10 is provided.

As described with reference to the third aspect of the present invention, to rather positively make the protective layer of the card providing a coating to some items of information take on an uneven form renders it difficult for forgers to reconstruct such an uneven form when they intend to falsify or forge the photograph of face, etc. Thus, falsifying or forging, if attempted, can immediately be found out, making it difficult to falsify or force the card.

Aspect 4

The fourth aspect of the present invention relates to a heat transfer image-receiving sheet characterized in that a dye receiving layer is provided on at least one major side of a hologram sheet.

A hologram sheet, which can hardly be made or forged by either an individual or a small entity, is provided thereon with a dye receiving layer, which is in turn allowed to carry thereon a personal item of information such as a photograph of face. This sheet is then laminated on the surface of a certain certificate, thereby making its counterfeiting or falsifying difficult.

The fourth aspect of the present invention will now be explained with reference to preferred embodiments illustrated in the accompanying drawings.

Figure 16:
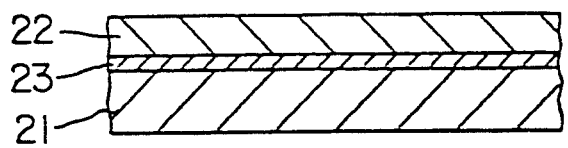
Figure 17:
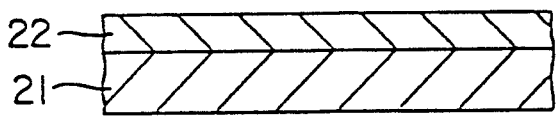
Figure 18:
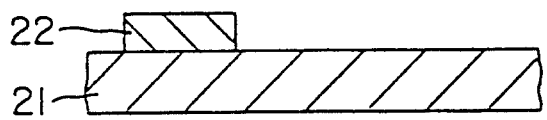

As illustrated in FIGS. 16 to 18, the heat transfer image receiving sheet according to this aspect is characterized in that a dye receiving layer 22 is formed on at least one major side of a hologram sheet 21 (see esp. FIG. 17). In another embodiment of this image receiving sheet, an intermediate layer 23 may be interposed between a hologram sheet 21 and a dye receiving layer 22, as illustrated in FIG. 16. The dye receiving layer 22 may then be formed all over (FIGS. 16 and 17), or on a part of (FIG. 18), the hologram sheet 21. When the dye receiving layer is placed all over the hologram sheet as shown in FIGS. 16 or 17, the dye receiving layer should be so transparent or semitransparent that a holographic image can be seen through it. When provided locally as shown in FIG. 18, however, the dye receiving layer may not always be transparent or semi-transparent.

Furthermore, when the image formed on the dye receiving layer is viewed from the hologram sheet, the hologram sheet and intermediate layer should both be transparent or semi-transparent, whereas when the image is viewed from the dye receiving layer, the hologram sheet may not always be transparent or semi-transparent.

The hologram sheet 21 used for the image receiving sheet according to the fourth aspect of this invention carries a holographic image, which is reproducible either by white light such as daylight or illumination light or by specific reproduction light such as a laser beam. One type of holographic image reproduced by white light such as daylight or illumination light has an improved ornamental effect, since it can be viewed even in a normal state. Another type of holographic image reproducible by a laser beam makes it easier to detect forging or counterfeiting.

Such a hologram sheet 21 per se is well-known in the art, as set forth in greater detail in a number of specifications of our prior applications directed to the production and exploitation of holograms or in Takeuchi, "Printing Information", No. 3, pp. 17-24 (1986).

Any known volume or relief types of hologram sheets, if they meet the above-mentioned conditions, can all be useful in the fourth aspect of this invention. One typical example is diagrammatically illustrated in FIG. 19.

Figure 19:
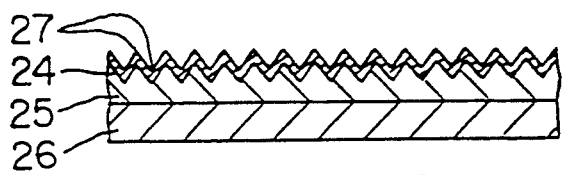

Referring to FIG. 19, the hologram sheet illustrated is constructed from an assembly of a holographic effect layer 24, a hologram forming layer 25 and a support 26 laminated together successively.

In order to make such a hologram sheet, the support film 26 such as a polyethylene terephthalate film is first provided on its surface with a layer of resin which is solid at normal temperature and capable of being thermally formed, for instance, a layer 25 (a hologram forming layer) of resin which is solid at normal temperature, thermoplastic and capable of being cured upon exposure to ionizing radiations. Then, a holographic plate (not shown) having thereon an irregular holographic interference pattern is pressed against the surface of the layer 34 to transfer that irregular pattern shown at 27, onto it, followed by curing. Finally, the thus transferred layer is provided on its surface, now patterned, with the holographic effect layer 24 formed of a thin film (e.g., an aluminized thin film) of material which combines sufficient transparency with high reflecting properties at a certain angle and is different in the index of refraction from the hologram forming layer 25. Thus, the hologram sheet may be formed in conventional known manners started with conventional known materials.

With such a hologram sheet appearing to be transparent or semi-transparent as a whole, the holographic image can be viewed by reflected light through the holographic effect layer or even by transmitted light because of the holographic effect layer 24 being nearly transparent. As a matter of course, this hologram sheet would be made entirely transparent in the absence of that holographic effect layer.

Although not critical, this hologram sheet may generally have a thickness lying between about 10 μm and about 300 μm.

In case the hologram sheet 21 if found to be poor in the adhesion to the dye receiving layer 22 to be formed on its surface, that surface should preferably be primed or otherwise treated with corona discharging.

The dye receiving layer 22 formed on the surface of the above hologram sheet is to receive a sublimable dye coming from a heat transfer sheet and maintain an image formed thereby.

The resins for forming the dye receiving layer, for example, may include polyolefinic resin such as polypropylene; halogenated polymers such as polyvinyl chloride and polyvinylidene chloride; vinyl polymers such as polyvinyl acetate and polyacrylic ester; polyester type resin such as polyethylene terephthalate; polystyrene type resin; polyamide type resin; resin based on copolymers of olefins such as ethylene and propylene with other vinyl monomers; ionomer; cellulosic resin such as cellulose acetate; and polycarbonate. Particular preference is given to vinylic resin and polyester type resin.

In order to obtain the heat transfer image receiving sheet according the fifth aspect of this invention, such a resin as mentioned above, together with the required additives, may be either dissolved in a suitable organic solvent into a solution or dispersed in an organic solvent or water into a dispersion. Then, the solution or dispersion is coated on at least one major side of the hologram sheet through the intermediate layer 23, if required, by suitable forming means, e.g., gravure printing, screen printing or reverse roll coating with a gravure plate. Finally, the dye receiving layer is formed by drying.

When forming the above dye receiving layer, use may additionally be made of ultraviolet absorbers or antioxidants in order to improve the light resistance of the image to be formed.

Although not critical, the thus formed dye receiving layer may generally have a thickness lying between 1 μm and 50 μm. Preferably, such a dye receiving layer should be in continuous form. However, it may be in discontinuous form achieved by using a resin emulsion or dispersion.

Basically, the heat transfer image receiving sheet according to the fourth aspect of this invention, constructed as mentioned above, may sufficiently be used as such. More preferably, however, the dye receiving layer according to this aspect should contain a release agent in order to impart improved releasability to the heat transfer sheet. Preferable release agents may include silicone oil, phosphate type surface active agents, fluorine type surface active agents and so on. The most preference is given to silicone oil.

Furthermore, the intermediate layer 23, if required, may be provided between the hologram sheet 21 and dye receiving layer 22 of the image receiving sheet according to this aspect of the present invention. For instance, when there is a poor adhesion between the hologram sheet and the dye receiving layer, that intermediate layer may be formed of a resin of improved adhesion. When the hologram sheet is likely to be attached on its surface while the dye receiving layer is formed, that intermediate layer may be formed of a water-soluble resin or a water-dispersible resin as a protective layer. Additionally, it may be formed of a resin having improved cushioning properties as a cushioning layer so as to enhance printability at the time of heat transfer. The material, of which the intermediate layer is to be formed, may be selected depending upon its purpose.

The heat transfer sheet is used for carrying out heat transfer with the heat transfer image receiving layer, including a sublimable dye-containing dye layer on paper or a polyester film. Any heat transfer sheet heretofore known in the art may be used as such for the fourth aspect of this invention.

Application of heat energy at the time of heat transfer may be achieved by any means hitherto known to this end. For instance, the desired object can be well-attained by the application of a heat energy of about 5 to 100 mJ/mm$^2$ for a controlled period of time with a thermal printer (e.g., Video Printer VY-100 made by Hitachi, Ltd.).

The heat transfer image receiving sheet according to the fourth aspect of this invention may be used to prepare a passport or ID card by way of example, to which explanation will now be made.

Figure 20:
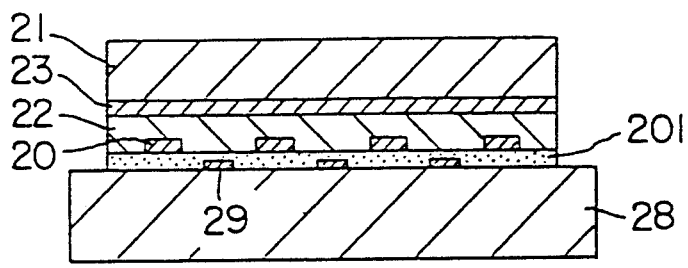

Referring first to FIG. 20, a substrate sheet 28 for a desired passport is provided. Then, general items of common information 29 such as the name and symbol of the country and instructions/articles common to all countries are recorded in the blank. These recordings may be reproduced as by printing in large quantities.

Then, personal items of information 20 such as a photograph of face and a signature as well as the necessary items are recorded on the dye receiving layer 22 of the image receiving sheet with a heat transfer printer. The thus obtained image receiving sheet is bonded onto the surface of the substrate sheet 28 bearing the general items of common information by suitable bonding means such as an adhesive layer 201, thereby obtaining the desired passport.

Alternatively, while the image receiving sheet with the dye receiving layer formed on it is correctly placed in the passport to be prepared, the personal information may be recorded on the dye receiving layer by a heat transfer printer of small size. While the substrate sheet is provided thereon with a transparent heat-sensitive adhesive layer by way of example, on the other hand, the image receiving sheet bearing the personal information may be bonded onto the substrate sheet bearing the common information by making use of that adhesive layer, thereby obtaining the passport.

Figure 21:
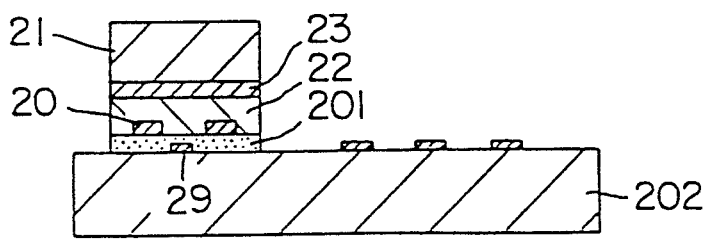

Turning then to FIG. 21, there is shown how to prepare the ID card. In this embodiment, the card substrate 202 used may be made of a hard film of polyvinyl chloride or polyester, and bears thereon such general information 29 as mentioned above. Bonded onto the surface of this sheet through a similar adhesive layer 201 as mentioned above is the image receiving sheet according to the fourth aspect of this invention. In this instant embodiment, however, it is noted that the image receiving sheet is bonded onto only a part of the card substrate.

Because the image receiving sheet according the fourth aspect of this invention is designed such that a heat transferred image 20 is viewed from the hologram sheet, the hologram sheet 21, image receiving layer 22 and intermediate layer 23 all have to be transparent or semi-transparent.

While the fourth aspect of this invention has been described with reference to its preferred embodiments, it is understood that it is equally applicable to various cards certifying the bearers' nationalities or citizenships, addresses, dates of birth, places of employment, duties and authorities such as student's cards, ID cards issued by private enterprises and public agencies and membership cards issued by various clubs as well as various ID cards heretofore available. It is understood, however, that this invention is not limited to such identification cards. For instance, this invention may be useful to prepare various prints having increased ornamental effects.

By using the heat transfer image receiving sheet according to the fourth aspect of this invention for various certificates, for instance, by bonding the holographic image receiving sheet onto the surfaces of the information bearing regions of ID cards like passports, it is nearly impossible to falsify or counterfeit them secretly, since these holograms cannot possibly be reproduced by either individuals or small entities.

When ID cards or other certificates are prepared by recording photographs of face and signatures on the dye receiving layer by a sublimation type heat transfer technique, it is impossible to falsify or counterfeit them. This is in part because if the holographic image receiving layer is released with the intention of counterfeiting these photographs of face, etc., then the images forming them get out of order and impart because the photographs of face, etc. cannot possibly be replaced.

Aspect 5

The fifth aspect of this invention is directed to a heat transfer image sheet in which a dye receiving layer is formed on the surface of a substrate sheet, characterized in that a holographic image is formed at least locally between the substrate sheet and the dye receiving layer and/or at least locally on the back side of the substrate sheet.

By forming the holographic image at least locally between the substrate sheet and the dye receiving layer and/or at least locally on the back side of the substrate sheet, there is provided a heat transfer image receiving sheet which dispenses with any bonding work, is unlikely to cause release of the holographic image and can form a heat transferred image integral with the holographic image.

Figure 22:
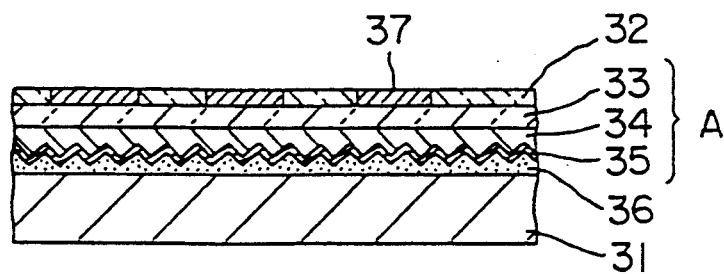
Figure 23:
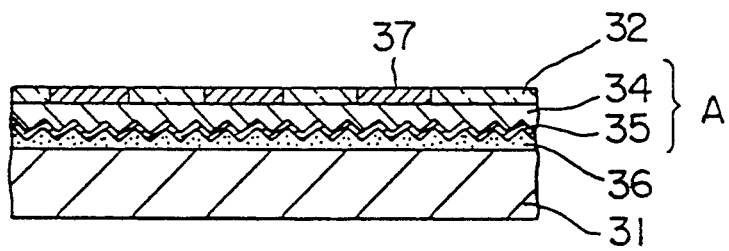
Figure 24:
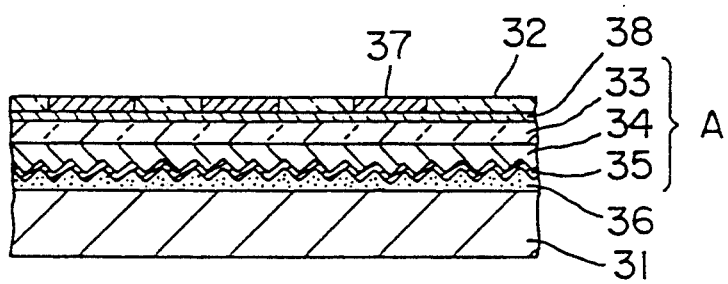

The heat transfer image receiving layer according to the fifth aspect of this invention is characterized in that a holographic image A is formed at least locally between a substrate sheet 31 and a dye receiving layer 33 and/or at least locally on the back side of the substrate sheet 31, as illustrated in FIGS. 22 to 24.

Referring to FIG. 22, there is diagrammatically shown in section one embodiment of the heat transfer image receiving sheet according to the fifth aspect of this invention.

The image receiving sheet according to this embodiment is obtained by forming the dye receiving layer 31 on the surface of a support film 33 of the hologram sheet A comprising the support film 33, a hologram forming layer 34 and a holographic effect layer 35 and then bonding the resulting assembly onto the substrate sheet 31 through an adhesive layer 35. Alternatively, the hologram sheet A may be bonded onto the substrate sheet 31 through the adhesive layer 36, and the dye receiving layer 32 may thereafter by formed on the surface of the support film 33 of the sheet A.

In the image receiving sheet according to this embodiment, the substrate sheet 31, adhesive layer 36 and holographic effect layer 33 may be either transparent or opaque, but the rest must be transparent or semi-transparent.

An image 37 is formed on the dye receiving layer 32 of such an image receiving sheet in heat transfer fashion. Since the holographic image A underlines the image 37, this image appears to be very specific and beautiful due to the synergistic effect of the holographic image A. For instance, making the holographic image A a deep landscape and making the heat transferred image a portrait result in a composite, three-dimensional image, unachievable by the sole use of each image.

Particularly because of being made of a dye, the heat transferred image 37 has the advantage of being of transparency so enhanced that the underlying holographic image can be viewed through it even when it is formed over a large area.

Use of such an image receiving sheet, therefore, provides a very specific and bodily image with neither need of bonding the hologram sheet nor fear of the hologram sheet, once bonded in place, peeling off.

FIG. 23 is a diagrammatically sectioned view of another embodiment of the heat transfer image receiving sheet according to the 5th aspect of this invention, wherein the support film 33 is removed from the hologram sheet A.

The image receiving sheet according this embodiment is obtained by bonding the hologram sheet A onto the substrate sheet 31 as shown in FIG. 22, then removing the support sheet 33 and finally forming the dye receiving layer 32 on the hologram forming layer 34, and produces an effect similar to that obtained with the embodiment illustrated in FIG. 22.

FIG. 24 is a diagrammatical illustration in section of yet another embodiment of the heat transfer image receiving sheet according to the fifth aspect of this invention, wherein an adhesive layer is interposed between the hologram sheet A and the dye receiving layer 32. This embodiment is useful when the dye receiving layer 32 shows a poor adhesion to the support film 33 of the hologram sheet A, having a similar improved effect, as is the case with the embodiment illustrated in FIG. 22.

While the fifth aspect of this invention has bee described with reference to its preferred embodiments, it is understood that the hologram sheet A may not necessarily by placed all over the surface of the substrate sheet 31. For instance, it may be formed on a part of the substrate sheet 31. If the substrate sheet 31 and adhesive layer 35 are transparent, then the hologram sheet A may be formed on the back side of the substrate sheet 31 with the same effect as already mentioned.

The substrate sheet used according to the fifth aspect of this invention may be formed of any known material. For instance, use may be made of synthetic paper (based on polyolefin, polystyrene, etc.), fine paper, art or coated paper, cast coated paper, wall paper, lining paper, synthetic resin or emulsion-impregnated paper, synthetic rubber latex-impregnated paper, synthetic resin-incorporated paper, paperboard, cellulose fiber paper; films or sheets of various plastics such as polyolefin, polyvinyl chloride, polyethylene terephthalate, polystyrene, polymethacrylate, and polycarbonate; or white, opaque films or formed sheets obtained by adding white pigments and fillers to such plastics or the like.

Furthermore, laminates comprising any desired combinations of the above substrate sheets may be used to this end. Typical examples of the laminates are those of cellulose fibers with synthetic paper or cellulose fibers with plastic films or sheets. Although not critical, these substrate sheets may generally have a thickness of, say, about 10 to 300 $\mu$m.

Although not critical, the hologram sheet A used according to the fifth aspect of this invention may be a sheet having a holographic image of the transparent, semi-transparent or opaque (reflection) type.

Such a hologram sheet per se is well-known in the art, as set forth in greater detail in a number of specifications of our prior applications directed to the production and exploitation of holograms or in Takeuchi, "Printing Information", No. 3, pp. 17-24 (1986).

Particularly preferred in the 5th aspect of this invention is a relief hologram.

The relief hologram is three-dimensionally reproducible either by white light such as daylight or illumination light or by specific reproduction light such as a laser beam. One type of holographic image reproduced by white light such as daylight or illumination light has an improved ornamental effect, since it can be viewed even in a normal state. Another type of holographic image, reproducible by a laser beam, makes it easier to detect forging or counterfeiting.

The relief hologram will now be explained with reference to FIG. 22. The relief hologram is constructed form a support film 33, a hologram forming layer 34 and a holographic effect layer 35 laminated together in that order.

In order to make such a hologram sheet, the support film 33 such as a polyethylene terephthalate film is first provided on its surface with a layer of resin which is solid at normal temperature and capable of being thermally formed, for instance, a layer 34 (a hologram forming layer) of resin which is solid at normal temperature, thermoplastic and capable of being cured upon exposure to ionizing radiations. Then, a holographic plate (not shown) having thereon an irregular holographic interference pattern is pressed against the surface of the layer 34 to transfer that irregular pattern onto it, followed by curing. Finally, the thus transferred layer is provided on its surface, now patterned, with the holographic effect layer 35 formed of a thin film (e.g., and aluminized thin film) of material which combines sufficient transparency with high reflecting properties at a certain angle and is different in the index of refraction from the hologram forming layer 34. Thus, the hologram sheet may be formed in conventional known manners started with conventional known materials.

With such a hologram sheet appearing to be transparent or semi-transparent as a whole, the holographic image can be viewed by reflected light through the holographic effect layer or even by transmitted light because of the holographic effect layer 35 being nearly transparent. As a matter of course, this hologram sheet would be made entirely transparent in the absence of that holographic effect layer. If the holographic effect layer is made of an opaque and reflecting metal or the like, then the opaque (reflection) type of relief hologram is obtained.

Although not critical, this hologram sheet may generally have a thickness lying between about 10 $\mu$m and about 300 $\mu$m.

In case the hologram sheet A if found to be poor in the adhesion t the dye receiving layer 32 to be formed on its surface, that surface should then preferably be primed or otherwise treated with corona discharging, thereby forming such an adhesive layer 38 as shown in FIG. 24.

The dye receiving layer 32 formed on the surface of the above hologram sheet A is to receive a sublimable dye coming from a heat transfer sheet and maintain an image formed thereby.

The resins for forming the dye receiving layer, for example, may include polyolefinic resin such as polypropylene; halogenated polymers such as polyvinyl chloride and polyvinylidene chloride; vinyl polymers such as polyvinyl acetate and polyacrylic ester; polyester type resin such as polyethylene terephthalate; polystyrene type resin; polyamide type resin; resin based on copolymers of olefins such as ethylene and propylene with other vinyl monomers; ionomer; cellulosic resin such as cellulose acetate; and polycarbonate. Particular preference is given to vinylic resin and polyester type resin.

In order to obtain the heat transfer image receiving sheet according the fifth aspect of this invention, such a resin as mentioned above, together with the required additives, may be either dissolved in a suitable organic solvent into a solution or dispersed in an organic solvent or water into a dispersion. Then, the solution or dispersion is coated on the surface of the hologram sheet by suitable forming means, e.g., gravure printing, screen printing or reverse roll coating with a gravure plate. Finally, the dye receiving layer is formed by drying. It is understood that the thus formed dye receiving layer should be so transparent or semi-transparent that the underlying holographic image can be seen through it.

Although not critical, the thus formed dye receiving layer may generally have a thickness lying between 1 $\mu$m and 50 $\mu$m. Preferably, such a dye receiving layer should be in continuous form. However, it may be in discontinuous form achieved by using a resin emulsion or dispersion.

Basically, the heat transfer image receiving sheet according to the fifth aspect of this invention, constructed as mentioned above, may sufficiently be used as such. More preferably, however, the dye receiving layer according to this aspect should contain a release agent in order to impart improved releasability to the heat transfer sheet.

Preferable release agents may include silicone oil, phosphate type surface active agents, fluorine type surface active agents and so on. The most preference is given to silicone oil.

More preferably, the above silicone oil should be modified by epoxy, alkyl, amino, carboxyl, alcohol, fluorine, alkylaralkyl polyether, epoxy-polyether, polyether, etc.

One or two or more release agents may be used in an amount of 1 to 20 parts by weight per 100 parts by weight of the dye receiving layer forming resin. If the amount of the release agent or agents added departs from the above-defined range, problems arise such as the fusion of the heat transfer sheet to the dye receiving layer or a lowering of printing sensitivity. Preferably, such a release agent or agents accounts for about 0.5 to 30% by weight of the dye receiving layer.

By the choice of the substrate sheet use, the image receiving sheet according to the fifth aspect of this invention may have various application as heat transfer recordable sheets to be heat-transferred, cards, sheets for preparing transmission type of MSS, and the like.

If required, a cushioning layer may be interposed between the hologram sheet A and the dye receiving layer 31 according to the fifth aspect of this invention, thereby making a heat transfer record of an image corresponding to image information with reduced noise and improved reproducibility at the time of printing.

The materials, of which the cushioning layer is made, may be polyurethane resin, acrylic resin, polyethylene type resin, butadiene rubber and epoxy resin, by way of example alone. Preferably, the cushioning layer may have a thickness of about 2–20 $\mu$m.

Additionally, a slip layer may be provided on the back side of the substrate sheet. The material, of which it is made, may be methacrylate resin such as methyl methacrylate or the corresponding resin, vinylic resin such as copolymers of vinyl chloride with vinyl acetate and the like.

Moreover, a detection mark may be provided on the image receiving sheet. The detection mark is very convenient in locating the heat transfer and image receiving sheet relative to each other. For instance, the substrate sheet may be provided as by printing on its back side with a detection mark capable of be sensed by a phototube sensor.

The heat transfer sheet used in carrying out heat transfer with the heat transfer image receiving sheet according to the fifth aspect of this invention may be obtained by providing a sublimable dye-containing layer on paper or polyester films. To this end, conventional heat transfer sheets heretofore known in the art may all be used as such in the fifth aspect of this invention.

Effectively usable to this end are any dyes employed for conventional known heat transfer sheets. By way of example alone, mention is preferably made of red dyes such as MS Red G, Macrolex Red Violet R, Ceres Red 7B, Samaron Red HBSL, SK (Rubin) SEGL, (Bimircon) SN VP 2670 and Resolin Red F3BS; yellow dyes such as (Phorone) Brilliant Yellow S-6GL, PTY-52, Macrolex Yellow 6G and (Terasil) Golden Yellow 2RS; and blue dyes such as (Kayaset) Blue 714, (Vacsolin) Blue AP-FW, (Phorone) Brilliant Blue S-R, MS Blue 100 and (Dito) Blue No. 1.

Application of heat energy at the time of heat transfer may be achieved by any means hitherto known to this end. For instance, the desired object can be well-attained by the application of a heat energy of about 5 to 100 mJ/mm$^2$ for a controlled period of time with a thermal printer (e.g., Video Printer VY-100 made by Hitachi, Ltd.).

According to the fifth aspect of this invention, there is provided a heat transfer image receiving sheet in which a holographic image is pre-formed at least locally between a substrate sheet and a dye receiving layer and/or at least locally on the back side of the substrate sheet, whereby a heat transferred image integral with the holographic image can be formed with neither need of using any bonding work nor fear of the holographic image peeling off.

Aspect 6

The sixth aspect of this invention is directed to a laminated film for protecting the surface of a heat transfer image, characterized in that side film includes a holographic image on at least its part and an adhesive layer on its one side.

The laminated film is provided on at least its part with a holographic image and on its one side with an adhesive layer, and is then laminated on the surface of a heat transfer image, whereby an improved durability is imparted to the transfer printed image together with much fairer appearance and a peculiarity or designability. Use of this laminated film for making ID cards or other certificates in particular provides greater security against counterfeiting or falsifying, since the holographic image can hardly be prepared by simple equipment or small entities.

FIG. 25 is a sectional illustration of one embodiment of the laminated film according to the sixth aspect of this invention, which is characterized in that an adhesive layer 43 is formed on one major surface of a transparent laminated film 41 including a holographic image 42.

Through the adhesive layer 43, the laminated film according to this aspect of the invention is laminated on the imagewise surface of a heat transfer image sheet 47 including a heat transfer image 48, as shown in FIG. 26, whereby the service life of the printed image can be improved greatly. In addition, the heat transfer image 48 can be viewed from the laminated side simultaneously with the holographic image 42, as sketched in FIG. 27, with the result that the appearance, designability and peculiarity are improved as a whole.

In the embodiment described with reference to FIGS. 25-27, the holographic image 41 is provided on a part of the laminated film 41. In this case, the holographic image 42 may be of either the transparent type or the reflection type, and so is not critical. When using the reflection type of holographic image, however, it is required that the holographic image be not superposed on the underlying heat transfer image, because the underlying heat transfer image cannot be viewed when such superposition takes place.

Figure 28:
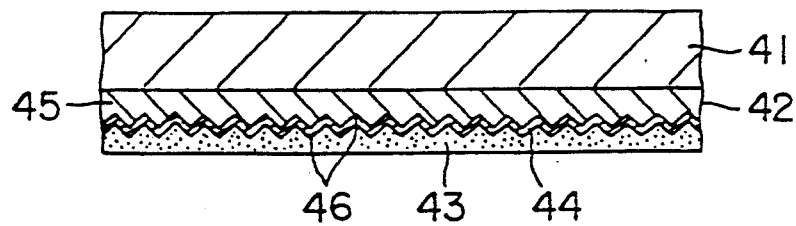
Figure 29:
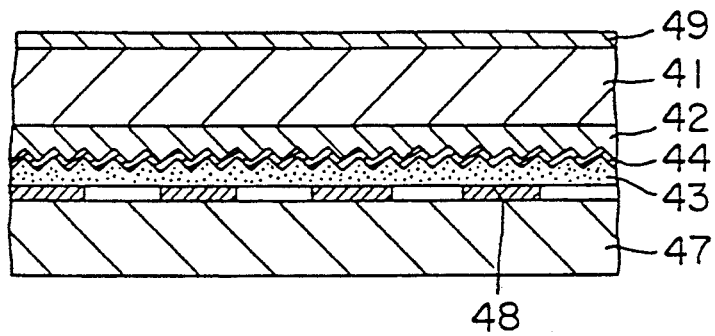

FIGS. 28 and 29 are illustrations of another preferable embodiment of the sixth aspect of this invention. This embodiment is basically identical with the embodiment shown in FIGS. 25-27, provided that a holographic image 42 of the transparent or semi-transparent type is placed all over the surface of a limited film 41.

Through an adhesive layer 43, this laminated film is laminated on the imagewise surface of a heat transfer image sheet 47 including a heat transfer image 48, as is the case with the above first embodiment, whereby the heat transfer image 48 can be viewed from the laminated side simultaneously with the holographic image 42, with the result that the appearance, designability and peculiarity are improved as a whole. This embodiment is particularly preferred because of the appearance, designability and peculiarity being further improved. This is because, owing to its transparency or semi-transparency, the holographic image 42 may be superposed on the underlying heat transfer image 48. Moreover, the laminated film 41 may be provided on its surface with a surface protecting film 49 of resin whose harded is increased.

Figure 30:
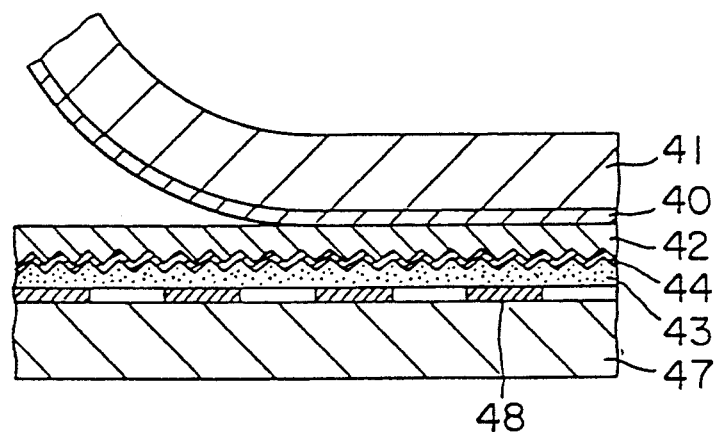

FIG. 30 is an illustration of yet another embodiment of the sixth aspect of this invention, in which a release layer 40 is interposed between a laminated film 41 and a holographic image 42. As is the case with the above second embodiment, the laminated film is removed after lamination. In this case, therefore, the holographic image 42 serves as a sort of laminated film.

The laminated film 41 used according to the sixth aspect of this invention may be of transparency sufficient to allow the underlying heat transfer image 48 to be viewed through it, and may be colored or matted. The most preference to this end is given to films of polyethylene terephthalate, polycarbonate, polyamide and the like. In consideration of transparency, mechanical strength, heat resistance and other factors, the polyethylene terephthalate film is potimum.

Although not critical, the holographic image 42 used according to the sixth aspect of this invention may be a holographic image of the transparent, semi-transparent or opaque (reflection) type heretofore known in the art.

Such a hologram image per se is well-known in the art, as set forth in greater detail in a number of specifications of our prior applications directed to the production and exploitation of holograms or in Takeuchi, "Printing Information", No. 3, pp. 17-24 (1986).

Particularly preferred in the sixth aspect of this invention is a relief hologram.

The relief hologram is three-dimensionally reproducible either by white light such as daylight or illumination light or by specific reproduction light such as a laser beam. One type of holographic image, reproduced by white light such as daylight or illumination light, has an improved ornamental effect, since it can be viewed even in a normal state. Another type of holographic image, reproducible by a laser beam, makes it easier to detect forging or counterfeiting.

The relief hologram will now be explained with reference to FIG. 28. The relief hologram is constructed from a support layer 42 (corresponding to the laminated film 42 in this aspect), a hologram forming layer 45 and a holographic effect layer 44 laminated together in that order.

In order to make such a hologram sheet, the support film 42 such as a polyethylene terephthalate film is first provided on its surface with a layer of resin which is solid at normal temperature and capable of being thermally formed, for instance, a layer 45 (a hologram forming layer) of resin which is solid at normal temperature, thermoplastic and capable of being cured upon exposure to ionizing radiations. Then, a holographic plate (not shown) having thereon an irregular holographic interference pattern is pressed against the surface of the layer 45 to transfer that irregular pattern, shown at 46, onto it, followed by curing. Finally, the thus transferred layer is provided on its surface, now patterned, with the holographic effect layer 44 formed of a thin film (e.g., an aluminized thin film) of material which combines sufficient transparency with high reflecting properties at a certain angle and is different in the index refraction from the hologram forming layer 45. Thus, the hologram sheet may be formed in conventional known materials.

With such a hologram sheet appearing to be transparent or semi-transparent as a whole, the holographic image can be viewed by reflected light through the holographic effect layer 44 or even by transmitted light because of the holographic effect layer 44 being nearly transparent. As a matter of course, this hologram sheet would be made entirely transparent in the absence of that holographic effect layer. If the holographic effect layer is made of an opaque and reflecting metal or the like, then the opaque (reflection) type of relief hologram is obtained.

Although not critical, this hologram sheet may generally have a thickness lying between about 10 μm and about 300 μm.

The adhesive layer 43 formed on the surface of the holographic image 42 may be made of either a heat-sensitive adhesive which is softened by heating to show adhesion or a pressure-sensitive adhesive which shows adhesion upon pressurized. Such heat- and pressure-sensitive adhesives are all well-known in the art and may be used as such for the sixth aspect of this invention. The adhesive layer, for instance, may have a thickness of about 5 to 50 μm. When the adhesive layer is formed of a pressure-sensitive adhesive, a release paper (not shown) may be applied on its surface.

On the other hand, the object on which the laminated film according to the sixth aspect of this invention is to be laminated includes a heat transfer image, and how to heat-transfer the heat transfer image is known in the art as well. Heat transfer techniques using a meltable type of heat transfer sheet including a pigment-containing wax layer on the surface of a substrate film or a sublimation type of heat transfer sheet having a substrate film provided on its surface with a dye layer carried with a thermally displaceable dye by means of a binder may all be usable according to the sixth aspect of this invention.

Effectively usable for the sublimation type of heat transfer sheet are any dyes employed for conventional known heat transfer sheets. By way of example alone, mention is preferably made of red dyes such as MS Red G, Macrolex Red Violet R, Ceres Red 7B, Samaron Red HBSL, SK (Rubin) SEGL, (Bimicrcon) SN VP 2670 and Resolin Red F3BS; yellow dyes such as (Phorone) Brilliant Yellow S6GL, PTY-52, Macrolex Yellow 6G and (Terasil) Golden Yellow 2RS; and blue dyes such as (Kayaset) Blue 714, (Vacsolin) Blue AP-FW, (Phorone) Brilliant Blue S-R, MS Blue 100 and (Dito) Blue No. 1.

The heat transfer image receiving sheet used for forming the heat transfer sheet may be known in the art as well, and may be formed of paper, plastic sheets, card substrates and like materials.

Referring to one sublimation type of heat transfer image receiving sheet by way of example, this image receiving sheet includes a suitable substrate film on which a dye receiving layer is formed. Usable to this end are any materials heretofore used for the dye receiving layers of conventional sheets to be heat-transferred. The materials, for instance, may be one of the following (a) to (e) or a mixture of two or more thereof.

(a) Materials having ester linkages
polyester, polyacrylic ester, polycarbonate, polyvinyl acetate, styrene acrylate resin, vinyltoluene acrylate resin, etc.

(b) Materials having urethane linkages
polyurethane, etc.

(c) Materials having amide linkages
polyamide such as nylon, etc.

(d) Materials having urea linkages
urea resin, etc.

(c) Materials having other linkages of high polarity
polycaprolactam, polystyrene, polyvinyl chloride, polyacrylonitrile, etc The dye receiving layer may also be formed of a mixed resin of an saturated polyester with a vinyl chloride/vinyl acetate copolymer. In this case, it is preferable that the vinyl chloride/vinyl acetate copolymer has a vinyl chloride content of 85-97% by weight and a polymerization degree of about 200-800. The vinyl chloride/vinyl acetate copolymer may also contain such components as vinyl alcohol and maleic acid.

In addition, the dye receiving layer may be comprised of styrene type resins other than the above-mentioned polystyrene. The styrene type resins, for instance, may include homo- or co-polymers of styrene type monomers such as styrene, α-methylstyrene and vinyltoluene; and copolymers of such styrene type monomers with other monomers, e.g., acrylic or methacrylic monomers such as acrylic acid ester, methacrylic acid ester, acrylonitrile and methacrylonitrile and monomers based on maleic anhydride and vinyl chloride/acrylic acid.

If required, ultraviolet absorbers may be incorporated into the above-mentioned dye receiving layer, thereby improving the weather resistance of the dye coming from the heat transfer sheet and fixed to the dye receiving layer. The ultraviolet absorbers used may be those based on benzophenone, hindered amines, benzotriazole and so on, and may be used in an amount of about 0.05 to 5 parts by weight per 100 parts by weight of the resin forming the dye receiving layer.

In required, the above-mentioned dye receiving layer may further contain a release agent with a view to improving its releasability with respect to the heat transfer sheet. The release agents used, for instance, may include solid waxes such as polyethylene wax, amide wax and Teflon powders, surface active agents based on fluorine and phosphoric acid or silicone oil, but preference is given to silicone oil. The silicone oil used may be in oily form, but should preferably be of the curing types, i.e., the reactive, photo- and catalytic curing types. The most preference is given to the reactive curing type of silicone oil. As the reactive curing type of silicone, use should preferably be made of one obtained by the reaction of an amino-modified silicone oil with an epoxy-modified silicone oil. The curing type of silicone oil should preferably be used in an amount of 0.5 to 30 parts by weight of 100 parts by weight of the resin forming the dye receiving layer. In addition to being incorporated into the dye receiving layer, the release agent may be dissolved or dispersed in a suitable solvent. The resulting solution may then be applied and dried on the surface of the dye receiving layer, thereby forming a release layer. As the release agent forming the release layer, particular preference is given to a cured product obtained by the reaction of an amino-modified silicone oil with an epoxy-modified silicone oil, as mentioned just above. Preferably, the release layer should be formed to a thickness of 0.01 to 5 $\mu$m, particularly 0.05 to 2 $\mu$m. The release layer may be applied all over the surface of the dye receiving layer or on a part thereof. When the release layer is formed on a part of the dye receiving layer, the sublimation heat transfer recording technique may be used in combination with other recording techniques. For instance, sublimation transfer recording may be applied to one part of the dye receiving layer on which the release layer is provided, while dot impact recording, thermal melting transfer recording, recording with a pencil or other recording is applied to another part of the dye receiving layer, on which no release layer is provided.

The sixth aspect of this invention, described with reference to its preferred embodiments, is useful for the lamination of films having various heat transfer images. For instance, the laminated film according to this aspect of the invention is equally applicable to various cards certifying the bearers' nationalities or citizenships, addresses, dates of birth, places of employment, duties and authorities such as student' s cards, ID cards issued by private enterprises and public agencies and membership cards issued by various clubs as well as various ID cards heretofore available. It is understood, however, that this invention is not limited to such identification cards. For instance, this invention may be useful to prepare various prints having an increased ornamental effect.

According to this aspect of the invention, the laminated film, on which the holographic image is formed locally and the adhesive layer is provided on its one side, is laminated on the imagewise surface of the heat transfer image, whereby an excellent durability can be imparted to the transfer-printed image together with much more improved appearance, peculiarity and designability. Especially when this laminated film is used to prepare ID cards or other certificates, it is possible to provide greater security against counterfeiting or falsifying, since it is difficult for small entities to make the holographic image with simple machinery.

Aspect 7

One classical technique for applying a photograph of face to each of various cards involves bonding it to a given region of the card with an adhesive. Problems with this technique are that it is very laborious; it makes the surface of the card uneven and so rids it of flatness; and it allows the card to be easily counterfeited or falsified by the replacement of another photograph of face.

In order to solve the defect of such an old technique as mentioned above, there has been developed a sublimation transfer type of imaging technique.

According to this heat transfer technique, a sublimation type of heat transfer sheet formed by providing onto the surface of a substrate film a layer containing a dye sublimable and transferable by heat is overlaid on a card substrate, and the assembly is heated from the back side of the sublimation transfer sheet with a thermal head to reproduce a photograph of face on the card substrate simultaneously with printing of various letters, characters and so on. Alternatively, these characters may be printed in a hot meltable ink type of heat transfer manner. In either case, this technique has the advantage of being able to be carried out with a simple thermal printer.

Since various items of information obtained by the above heat transfer technique are less than satisfactory in terms of such properties as rub resistance, however, the surface of the photograph, etc. is generally provided with a transparent surface protecting layer excelling in such properties as rub resistance.

Especially because the photograph is formed by fixing the dye in the card substrate, the card obtained by the above technique is of improved flatness and provides greater security against falsifying and counterfeiting. Even with this technique, however, there is not a little fear that the photograph and other information may be falsified or counterfeited by removing the protecting layer by solvents, acids, bases or the like.

As one method to eliminate such defectiveness as mentioned above, it has been known in the art to preform a special pattern on the surface of a card substrate with a ultraviolet curing ink (see Japanese Patent Kokai Publication No.63-170084). Required for this method, however, is that the pattern be printed so thinly that any inconvenience cannot be caused when the photograph, etc. or the protective layer is later printed or formed, posing a problem that any pattern excelling in such properties as rub resistance can never be obtained at all. A problem with the formation of the pattern all over the surface of a card surface is that a sublimation dye is so unlikely to be fixed on a layer on which the pattern is printed that a photograph of face in particular can become spotted. This leads to another problem that when only the region to be formed with a photograph of face, etc. is printed, the pattern matches so ill with the photograph, etc. that a pattern-free zone can tend to appear around the photograph, etc. or the photograph, etc. can be superposed on the pattern, making the edge of the photograph blurred.

The above-mentioned problems can successfully be solved by the seventh aspect of this invention.

More specifically, the recording medium according to this aspect of the invention characterized in that some items of information such as a pattern, a photograph of face and letters or characters are formed on the surface of a card substrate, at least said pattern and photograph being formed by a sublimation transfer technique.

According to the seventh aspect of this invention, at least the pattern and photograph are both formed by a sublimation transfer technique, whereby they are formed on the same plane. Even if additional protective layer is formed on them, the flatness of that layer is then left intact. Even when the card substrate is provided on its entire surface with a pattern with a photograph of face, etc. being additionally provided thereon, the dye is so well-transferred that the photograph, etc. can remain in order. Moreover, the pattern can be formed together with the photograph with a computer-controlled printer, so that they can be formed simultaneously and so well-matched in every respect The seventh aspect of this invention will now be explained in greater detail with reference to its preferred embodiments. is a As can be seen from FIG. 31 which is a diagrammatical section of the card according to this aspect, a card substrate 51 is provided on its surface with a pattern 52 and a photograph 53 of face by a sublimation transfer technique and with letters or characters 54, etc. by any one of suitable desired techniques If required, a transparent protective layer 56 is provided on at least a part of the information carrier surface through an adhesive layer 55.

As long as it is provided on its surface with a dye receiving layer dyeable with a sublimable dye, the card substrate used for the card of the this aspect of this invention may be formed of any known material. For instance, use may be made of films or sheets of various plastics such as polyolefin, polyvinyl chloride, polyethylene terephthalate,polystyrene, polymethacrylate and polycarbonate. Use may further be made of white, opaque films or foamed sheets obtained from such synthetic resins to which white pigments and fillers are added. Use may further be made of synthetic paper (based on polyolefin, polystyrene, etc.), fine paper, art or coated paper, cast coated paper, wall paper, lining paper, synthetic resin or emulsion-impregnated paper, synthetic rubber latex-impregnated paper, synthetic resin-incorporated paper, paperboard, cellulose fiber paper or the like.

Still further, laminates comprising any desired combinations of the above substrate films may be used to this end.

Figure 31:
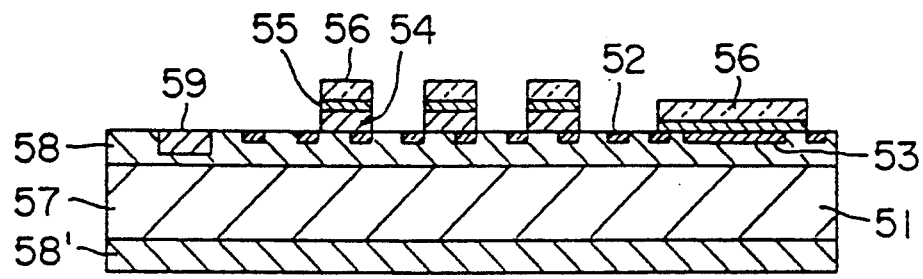

FIG. 31 is one preferable embodiment of the card substrate according to the seventh aspect of this invention, which comprises a center core 57 formed of polyvinyl chloride containing a white pigment and transparent polyvinyl chloride layers 58 and 58' laminated on both sides of the core 57. At least the transparent polyvinyl chloride layer 58, defining an imaging surface, contains a suitable amount of a plasticizer to make better the dyeability of a dye.

The quantity of the plasticizer incorporated is in a range of preferably 0.1 to 10 parts by weight, more preferably 3 to 5 parts by weight per 100 parts by weight of polyvinyl chloride forming the dye receiving layer 58. Too small a quantity of the plasticizer, on the one hand, makes its fixability with respect to the sublimable dye so insufficient that abnormal transfer can occur in which the dye layer of the heat transfer sheet is transferred as such during heat transfer. Too large an amount of the plasticizer, on the other hand, reduces and softens the dye receiving surface and causes the printed image to be blotted and so become unclear during storage.

Optionally, the above dye receiving layer 58 may contain any desired additives such as coloring pigments, white pigments, body pigments, fillers, UV absorbers, antistatics, thermal stabilizers and fluorescent brighteners.

The card substrate 51 may be pre-formed on its surface with the required magnetic recording layer 59 and, although not illustrated, an embossed or printed pattern, an optical or IC memory, a bar code and so on. Alternatively, it may be provided with them by heat transfer or other systems after the carrying of such information as the photograph of face.

The pattern 52 and photograph 53 to be carried on the card substrate 51 may be formed with a known sublimation type of heat transfer sheet in conventional manners. In this case, they may be formed separately, simultaneously or in superposed or non-superposed relation. The pattern to be carried may be defined specifically but not exclusively by fine lines, a pattern, letters or characters or a figure.

Simultaneously with this, such information as letters or characters may be formed with a sublimation type of heat transfer sheet. However, it is preferred that the literal information 54 is formed with a hot-meltable ink type of heat transfer sheet enabling black letters and characters to be printed at high density. Although it is understood that the photographic information 53 and literal information 54 may be formed with separate heat transfer sheets, more advantageous in view of process efficiency is that both types of information are formed simultaneously with a composite heat transfer sheet including a sublimable dye layer together with a meltable ink layer.

The lamination of the protective layer 56 for improving the service life or durability of the recorded information, e.g., the photograph of face, may be achieved by coating and drying a transparent coating material, laminating a transparent film and using a protective layer/heat transfer sheet. The protective layer 56 may be provided all over, or on a part of, the recorded information at a step separate from the step of recording each type of information. In a preferred embodiment of the present invention, however, use is made of a composite heat transfer sheet in which the substrate film is provided thereon with a sublimable dye layer of at least one color, a hot-meltable ink layer of at least one color and a protective layer in that order, thereby simultaneously forming a gradient image such as a photograph of face and a landscape, a monotonous image such as characters and markings and the transparent protective layer with the same heat transfer sheet.

Aspect 8

Reference will now be made to a heat transfer sheet used for heat transfer recording, which provides greater security against counterfeiting.

As already stated, one classical technique for applying a photograph of face to each of various cards involves bonding it to a given region of the card with an adhesive. Problems with this technique are that it is very laborious; it makes the surface of the card uneven and so rids it of flatness; and it allows the card to be easily counterfeited or falsified by the replacement of another photograph of face.

In order to solve the defect of such an old technique as mentioned above, there has been developed a sublimation transfer type of imaging technique.

According to this heat transfer technique, a sublimation type of heat transfer sheet formed by providing onto the surface of a substrate film a layer containing a dye sublimable and transferable by heat is overlaid on a card substrate, and the assembly is heated from the back side of the sublimation transfer sheet with a thermal head to reproduce a photograph of face on the card substrate. In order to easily treat characters, symbols, etc. other than the photograph with a mechanical reader, on the other hand, it is preferred that they are formed by a heat meltable ink type of heat transfer technique enabling them to be printed at high density.

Since various items of information obtained by this heat transfer technique are still less than satisfactory in terms of such properties as rub resistance, however, the surface of the photograph, etc. is generally provided with a transparent surface protecting layer excelling in such properties as rub resistance.

Especially because the photograph is formed by fixing the dye in the card substrate, the card obtained by the above technique is of improved flatness and provides greater security against falsifying and counterfeiting. A problem with this technique, however, is that the literal or symbolic information may easily be counterfeited or falsified because of being formed of a meltable ink. This problem becomes more serious especially when the card is checked up as by a mechanical reader without recourse to the photograph.

The above-mentioned problem can be solved by the provision of a heat transfer sheet characterized in that a substrate sheet is provided on its one side with a hot-meltable ink layer containing a sublimable ink.

The sublimable dye-containing hot-meltable ink layer forms characters, etc. upon transferred onto an image receiving sheet able to fix the dye, for instance, a card substrate. Simultaneously with this or with the lapse of time, the sublimable dye in said ink layer is fixed to the card substrate. Thus, the ink layer is formed on the surface of the substrate, while the sublimable dye therein penetrates the surface layer of the substrate, with the result that the printed portion is of a double-layer structure. It is noted that the sublimable dye and the ink define the same type of characters, which are apparently indistinguishable. An attempt to scratch off the characters defined by the ink and replace them by another characters would be unsuccessful, since said another characters are not superposed on the characters defined by the dye, which can be by no means scratched off. Thus, counterfeiting or falsifying, if attempted, would come out immediately.

The heat transfer sheet according to this aspect of the invention will now be explained in greater detail with reference to its preferred embodiment illustrated in FIG. 32.

As a substrate sheet 61 used for the above-mentioned heat transfer sheet, the same substrate sheet as heretofore available for conventional heat transfer sheets may be used as such. Other sheets may be employed as well. In this regard, there is no particular limitation.

Illustrative examples of preferable substrate sheets may include those based on plastics such as polyester, polypropylene, cellophane, polycarbonate, cellulose acetate, polyethylene, polyvinyl chloride, polystyrene, nylon, polyimide, polyvinylidene chloride, polyvinyl alcohol, fluorine resin, chlorinated rubber and ionomer;

papers such as condenser paper and paraffin paper; and unwoven fabrics. These sheets may also be formed into a composite sheet for use.

The thickness of the substrate sheet, for instance, may be in the range of 2 to 25 μm, although it may be varied depending upon the material used such that the desired strength and heat conductivity are achieved.

The hot-meltable ink used in the 8th aspect of this invention comprises a pigment, a sublimable ink and a vehicle with the incorporation of various additives, if required.

The pigment, whether organic or inorganic, may be one having properties suitable for recording. For instance, pigments capable of developing a color at sufficient density but incapable of being discolored and faded by light, heat, temperature and other parameters may be used. Particular preference is given to carbon black. Of course, use may be made of pigments of cyan, magenta, yellow and other hues.

Effectively usable to this end are any dyes employed for conventional known heat transfer sheets. By way of example alone, mention is preferably made of red dyes such as MS Red G, Macrolex Red Violet R, Ceres Red 7B, Samaron Red HBSL, and Resolin Red F3BS; yellow dyes such as (Phorone) Brilliant Yellow S-6GL, PTY-52 and Macrolex Yellow 6G; and blue dyes such as (Kayaset) Blue 714, (Vacsolin) Blue AP-FW, (Phorone) Brilliant Blue S-R, MS Blue 100 and (Dito) Blue No. 1.

Satisfactory effects are achievable when such a dye as mentioned above is used in an amount ranging from 0.1 to 30 parts by weight per 100 parts by weight of the pigment.

The vehicle used may be composed chiefly of a resin having a relatively low softening point, a copolymer of vinyl acetate in particular with other monomers and a variety of waxes. Alternatively, use may be made of mixtures of waxes with dry oils, resins, mineral oils, cellulose, rubber derivatives or the like. Typical examples of the waxes include microcrystalline wax, carnauba wax and paraffin wax. In addition, use may be made of a variety of waxes such as Fisher-Tropsch wax, various low-molecular weight polyethylenes, Japan wax, beeswax, spermacetic, ibotawax, wool wax, shellac wax, candelilla wax, petrolactam, a partially modified wax, fatty acid ester and fatty acid amide. Thus, use may be made of all the waxes used for conventional hot-melt types of heat transfer sheets heretofore known in the art.

Especially when the material to be heat-transferred is one formed of polyvinyl chloride as is the case of the card substrate, it is more preferable that the following resinous binder is used in view of the adhesion to the card substrate and the resistance to scratching.

(1) acrylic resin;
(2) acrylic resin+chlorinated rubber;
(3) acrylic resin+vinyl chloride/vinyl acetate copolymer type resin;
(4) acrylic resin+cellulosic resin; and
(5) vinyl chloride/vinyl acetate copolymer type resin.

Application of a hot-meltable ink layer 2 directly or indirectly onto the substrate sheet 61 may be achieved by not only hot-melt coating but also many other means such as hot-lacquer coating, gravure coating, gravure reverse coating and roll coating. The thickness of the ink layer to be formed should be determined such that the required density and heat sensitivity are well-balanced, and should be in the range of 0.1 to 30 μm, preferably 1 to 20 μm.

According to the eighth aspect of this invention, the ink layer may further be provided with a surface layer (not illustrated) comprising waxes, heat-sensitive adhesives and the like, thereby improving the adhesion between the ink layer and the image receiving layer at the time of transfer.

When a material susceptible to heat is used for the substrate sheet, it is preferred that it is provided on its surface to come in contact with a thermal head 63 with a heat-resistant layer 64 serving to prevent the thermal head 63 from sticking to that surface.

In order to form an image with such a heat transfer sheet as mentioned above, any image receiving sheet may be used, which can show dye-receptivity to the sublimable dye on its recording side. When the image receiving sheet is formed of, e.g., paper, a metal, glass and a synthetic resin, all free from dye receptivity, a dye receiving layer may then be provided on at least its one side.

How to prepare the card will now be explained typically with reference to using the heat transfer sheet according to the eighth aspect of this invention.

As long as it is provided on its surface with a dye receiving layer dyeable with a sublimable dye, the card substrate used for the card of the aspect of this invention may be formed of any known material. For instance, use may be made of films or sheets of various plastics such as polyolefin, polyvinyl chloride, polyethylene terephthalate, polystyrene, polymethacrylate and polycarbonate. Use may also be made of white, opaque films or foamed sheets obtained from such synthetic resins to which white pigments and fillers are added. Use may further be made of synthetic paper (based on polyolefin, polystyrene, etc.), fine paper, art or coated paper, cast coated paper, wall paper, lining paper, synthetic resin or emulsion-impregnated paper, synthetic rubber latex-impregnated paper, synthetic resin-incorporated paper, paperboard, cellulose fiber paper or the like.

Still further, laminates comprising any desired combinations of the above substrate films may be used to this end.

Figure 32:
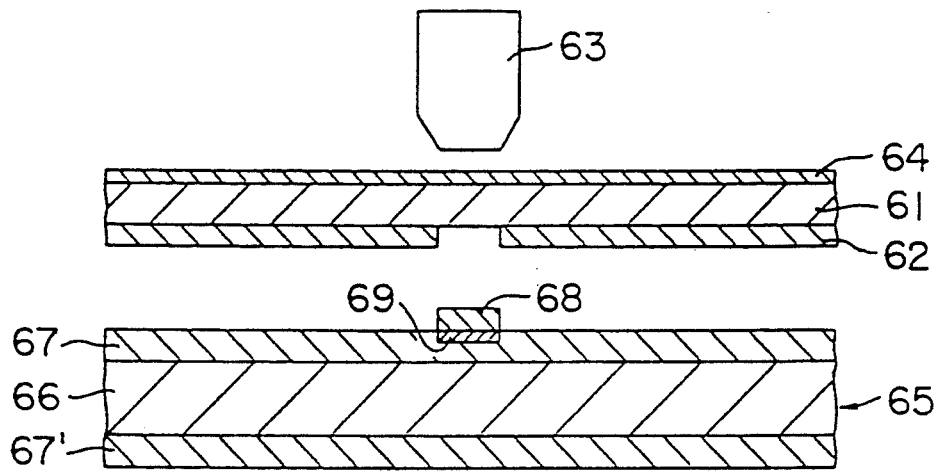
FIG. 32 is a sectional view providing an illustration of how an image is printed with a heat transfer sheet.

FIG. 32 is one preferable embodiment of the card substrate 65 according to the eighth aspect of this invention, which comprises a center core 66 formed of polyvinyl chloride containing a white pigment and transparent polyvinyl chloride layers 67 and 67' laminated on both sides of the core 66. At least the transparent polyvinyl chloride layer 67, defining an imagewise surface, contains a suitable amount of a plasticizer to make better the fixability of a dye.

The quantity of the plasticizer incorporated is in a range of preferably 0.1 to 10 parts by weight, more preferably 3 to 5 parts by weight per 100 parts by weight of polyvinyl chloride forming the dye receiving layer 67. Too small a quantity of the plasticizer, on the one hand, makes its fixability with respect to the sublimable dye so insufficient that abnormal transfer can occur in which the dye layer of the heat transfer sheet is transferred as such during heat transfer. Too large an amount of the plasticizer, on the other hand, reduces and softens the dye receiving surface and causes the printed image to be blotted and so become unclear during storage.

Optionally, the above dye receiving layer 67 may contain any desired additives such as coloring pigments, white pigments, body pigments, fillers, UV absorbers, antistatics, thermal stabilizers and fluorescent brighteners.

The card substrate 65 may be pre-formed on its surface with a recording layer, an embossed or printed pattern, an optical or IC memory, a bar cord (all now shown) and so on, although not illustrated. Alternatively, it may be provided with them by heat transfer or other systems after the carrying of such information as the photograph of face.

The photograph to be carried on the card substrate may be formed with a known sublimation type of heat transfer sheet in conventional manner.

Literal information 68, etc. may be formed with the heat transfer sheet according to this aspect of the invention. More specifically, while the ink layer 62 is located in opposition to the dye receiving layer 67, the heat transfer sheet is overlaid on the card substrate 65, and the assembly is then heated from the back side of the heat transfer sheet for printing, thereby transferring the ink layer 62 onto the dye receiving layer 67. In this case, at least a part of the dye in the ink layer is fixed onto the dye receiving layer 67 by heat at the time of printing, thus forming dyed characters 69. If a low-molecular-weight dye is used as the dye, then it passes from the ink layer 68 into the dye receiving layer 67 with the lapse of time, increasing the density of the dyed characters 69.

Upon a physical removal of the thus formed ink characters 68, the ink layer 68 is removed but the dyed characters 69 are not. Another characters, if formed, are unlikely to be superposed on the dyed characters 69. Thus, falsifying, if attempted, would come out immediately.

Although it is understood that the photographic information and literal information may be formed with separate heat transfer sheets, more advantageous in view of process efficiency is that both types of information are simultaneously formed with a composite heat transfer sheet including a sublimable dye layer together with a meltable ink layer containing a sublimable dye as already stated.

The lamination of a protective layer, not shown, for improving the service life or durability of the recorded information, e.g., the photograph of face, may be achieved by coating and drying a transparent coating material, laminating a transparent film and using a protective layer/heat transfer sheet. Such a protective layer may be provided all over, or on a part of, the recorded information at a step separate from the step of recording each type of information. In a preferred embodiment of this aspect of the invention, however, use is made of a composite heat transfer sheet in which the substrate sheet is provided thereon with a sublimable dye layer of at least one color, a hot-meltable ink layer of at least one color (containing a sublimable dye) and a protective layer in that order, thereby simultaneously forming a gradient image such as a photograph of face and a landscape, a monotonous image such as characters and markings and the transparent protective layer with the same heat transfer sheet.

According to the eighth aspect of this invention, the sublimable dye-containing hot-meltable ink layer is transferred onto an image receiving sheet able to fix the dye, for instance, a card substrate, thereby forming characters, etc. Simultaneously with this or with the lapse of time, the sublimable dye in said ink layer is fixed to the card substrate. It is noted that the sublimable dye and the ink define the same type of characters, which are apparently indistinguishable. an attempt to scratch off the characters defined by the ink and replace them by another characters would be unsuccessful, since said another characters are not superposed on the characters defined by the dye, which can never be scratched off. Thus, counterfeiting or falsifying, if attempted, would come out immediately.

The present invention will now be explained more illustratively with reference to the following examples, in which all parts and percentages (%) are by weight unless otherwise indicated.

EXAMPLE A1

A white core for a card substrate was prepared from a composition consisting of 100 parts of a polyvinyl chloride (with a polymerization degree of 800) compound containing about 10% of additives such as a stabilizer core being 0.2 mm in thickness and measuring 30×30 cm.

Prepared was then a transparent sheet (of 0.15 mm in thickness) consisting of 100 parts of the above-mentioned polyvinyl chloride compound containing 3 parts of a plasticizer and 1 part of a lubricant, which was in turn hot-pressed on each side of the white core to obtain a card substrate used according to this invention.

Inks of three colors, each having the following composition and containing a sublimable dye, were prepared.

Yellow Ink

| | |
|---|---|
| Disperse dye (Macrolex Yellow 6G - C.I. Disperse Yellow 201 by commercialized by Beyer) | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 89.0 parts |

Magenta Ink

The same as the above-mentioned yellow ink, except that a magenta disperse dye (C.I. Disperse Red 60) was used as the dye.

Cyan Ink

The same as the above-mentioned yellow ink, except that a cyan disperse dye (C.I. Solvent Blue 63) was used as the dye.

A 4.5-$\mu$m thick polyester film was provided, which had been formed on its back side with a heat-resistant slip layer (of 1 $\mu$min thickness) and on its front side with an adhesion-improving layer (of 0.5 $\mu$m in thickness) formed of a polyurethane type resin. By means of gravure coating, the above-mentioned ink compositions were then repeatedly coated and dried on the front side of that polyester film over a width of 15 cm in a coating amount of about 3 g/m$^2$ in order of yellow, magenta and cyan, thereby obtaining a heat transfer sheet containing the sublimable dye layers of three colors.

The sublimation heat transfer sheet was then overlaid on the card substrate, and a thermal energy was applied to the assembly with a thermal head connected to electrical signals obtained by the color separation of a photograph of face to effect sublimation transfer in the order of cyan, magenta and yellow, thereby forming a full-colored photograph.

By means of gravure coating, a release layer-forming ink having the following composition was coated and dried in an amount of 1 g/m$^2$ (on solid basis) on the front side of a polyester film similar to the above-mentioned one, thereby forming a release layer.

Release Layer-Forming Ink

| Acrylic resin | 20 parts |
| Methyl ethyl ketone | 100 parts |
| Toluene | 100 parts |

By means of gravure coating, the following ink was coated and dried on the front side of the release layer in an amount of about 3 g/m$^2$ to form a hot meltable ink layer, thereby obtaining a hot melting type of heat transfer sheet.

Hot Meltable Ink

| Acrylic/vinyl chloride/vinyl acetate copolymer Resin | 20 parts |
| Carbon black | 10 parts |
| Toluene | 35 parts |
| Methyl ethyl ketone | 35 parts |

The heat transfer sheet was overlaid on the blank space of the card on which the photographic image had been formed, thereby forming symbolic images such as numerals, characters and other literal images and a bar code.

A 4.5-μm thick polyester film was provided, which had been formed on its back side with a heat-resistant slip layer and on its front side with an adhesion-improving layer (of 0.1 μm in thickness) formed of a polyester type resin. By means of gravure coating, a protective layer-forming ink having the following composition was then coated and dried on the front side of that film in an amount of 4 g/m$^2$ (on solid basis), thereby forming a protective layer Protective Layer-Forming Ink

| Acrylic resin (BR-83 commercialized by Mitsubishi Rayon Co., Ltd.) | 20 parts |
| Polyethylene wax | 1 part |
| Methyl ethyl ketone | 50 parts |
| Toluene | 50 parts |

With a gravure ink containing a transparent red pigment, a transparent pattern was then printed on the front side of the protective layer to form a patterned layer. Subsequently, an adhesive layer-forming ink having the following composition was further coated and dried on the protective layer in an amount of 1 g/m$^2$ (on solid basis) to form an adhesive layer, thereby obtaining a heat transfer sheet combined with the protective layer Adhesive Layer-Forming Ink

| Acrylic/vinyl chloride/vinyl acetate copolymer (HS-32G commercialized by Showa Ink Co., Ltd.) | 20 parts |
| Methyl ethyl ketone | 100 parts |
| Toluene | 100 parts |

With the heat transfer sheet combined with the protective layer, the protective layer was then transferred onto the surface of the photograph as obtained above by a heat transfer technique to obtain a card according to the present invention. The protective layer was then removed from the card to retouch the photograph and form another protective layer with lacquer. However, this fact of falsifying came out immediately.

EXAMPLES A2–A5

Heat transfer sheets combined with protective layers were prepared by using the following inks in place of the patterned layer of the heat transfer sheet combined with the protective layer, obtained in Ex. A1. The procedures of Ex. A1 were otherwise repeated to obtain cards according to the present invention.

| Examples | Inks Used | Patterns |
| --- | --- | --- |
| A2 | Gravure ink containing fluorescent dye | Symbolic mark |
| A3 | Gravure ink containing fluorescent brightener | Lattice |
| A4 | Gravure ink containing UV absorber | Geometric pattern |
| A5 | Gravure ink containing IR absorber | Uniform all over the surface |

The pattern of the card of Ex. A1 can be seen through visually, but that of Exs. A3–A5 cannot. The under black light; that of Ex. A4 is distinguishable in the form of a black shadow under black light; and that of Ex. 5 is detectable with an infrared detector.

The cards were all difficult to falsify.

EXAMPLE A6

The card substrate, sublimation type of heat transfer sheet, hot melting type of heat transfer sheet and heat transfer sheet combined with the protective layer (having no patterned layer) used in Ex. A1 were used for the transfer of a photograph of face, characters and a protective layer. Printed thereon was a checkered pattern with a sublimation type of heat transfer, using a low printing energy. Further thereonto, the protective layer was re-transferred to obtain such a card according to this invention as shown in FIG. 4. The card, having a visually observable thin checkered pattern on the photograph, was again difficult to falsify.

EXAMPLE 1

A white core for a card substrate was prepared from a composition consisting of 100 parts of a polyvinyl chloride (with a polymerization degree of 800) compound containing about 10% of additives such as a stabilizer and 15 parts of a white pigment (titanium oxide), said core being 0.2 mm in thickness and measuring 30×30 cm.

Prepared was then a transparent sheet (of 0.15 mm in thickness) containing of 100 parts of the above-mentioned polyvinyl chloride compound containing 3 parts of a plasticizer and 1 part of a lubricant, which was in turn hot-pressed on each side of the white core to obtain the card substrate used according to this invention.

Inks of three colors, each having the following composition and containing a sublimable dye, were prepared.

Yellow Ink

| Disperse dye (Macrolex Yellow 6G - C.I. Disperse Yellow 201 by commercialized by Beyer | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 89.0 parts |

Magenta Ink

The same as the above-mentioned yellow ink, except that a magenta disperse dye (C.I. Disperse Red 60) was used as the dye.

Cyan Ink

The same as the above-mentioned yellow ink, except that a cyan disperse dye (C.I. Solvent Blue 63) was used as the dye.

A 4.5-μm thick polyester film was provided, which had been formed on its back side with a heat-resistant slip layer (of 1 μm in thickness) and on its front side with an adhesion-improving layer (of 0.5 μm in thickness) formed of a polyurethane type resin. By means of gravure coating, the above-mentioned ink compositions were then repeatedly coated and dried on the front side of that polyester film over a width of 15 cm in a coating amount of about 3 g/m$^2$ in the order of yellow, magenta and cyan, thereby obtaining a heat transfer sheet containing the sublimable dye layers of three colors.

The sublimation heat transfer sheet was then overlaid on the card substrate, and a thermal energy was applied to the assembly with a thermal head connected to electrical signals obtained by the color separation of a photograph of face to effect sublimation transfer in the order of cyan, magenta and yellow, thereby forming a full-colored photograph.

By means of gravure coating, a release layer-forming ink having the following composition was coated and dried in an amount of 1 g/m$^2$ (on solid basis) on the front side of a polyester film similar to the above-mentioned one, thereby forming a release layer.

Release Layer-Forming Ink

| | |
|---|---|
| Acrylic resin | 20 parts |
| Methyl ethyl ketone | 100 parts |
| Toluene | 100 parts |

By means of gravure coating, the following ink was coated and dried on the front side of the release layer in a coating amount of about 3 g/m$^2$ to form a hot meltable ink layer, thereby obtaining a hot melting type of heat transfer sheet.

Hot Meltable Ink

| | |
|---|---|
| Acrylic resin + chlorinated rubber | 20 parts |
| Carbon black | 10 parts |
| Toluene | 35 parts |
| Methyl ethyl ketone | 35 parts |

The heat transfer sheet was overlaid on the blank space of the card on which the photographic image had been formed, thereby forming symbolic images such as numerals, characters and other literal images and a bar code.

A 4.5-μm thick polyester film was provided, which had been formed on its back side with a heat-resistant slip layer and on its front side with an adhesion-improving layer (of 0.1 μm in thickness) formed of a polyester type resin. By means of gravure coating, a protective layer-forming ink having the following composition was then coated and dried on the front side of that film in an amount of 4 g/m$^2$ (on solid basis), thereby forming a protective layer.

Protective Layer-Forming Ink

| | |
|---|---|
| Acrylic resin (BR-83 commercialized by Mitsubishi Rayon Co., Ltd.) | 20 parts |
| Transparent red pigment | 0.01 part |
| Polyethylene wax | 1 part |
| Methyl ethyl ketone | 50 parts |
| Toluene | 50 parts |

Subsequently, an adhesive layer-forming ink having the following composition was coated and dried on the protective layer in an amount of 1 g/m$^2$ (on solid basis) to form an adhesive layer, thereby obtaining a heat transfer sheet combined with the protective layer.

Adhesive Layer-Forming Ink

| | |
|---|---|
| Acrylic/vinyl chloride/vinyl acetate copolymer (HS-32G commercialized by Showa Ink Co., Ltd.) | 20 parts |
| Methyl ethyl ketone | 100 parts |
| Toluene | 100 parts |

With the heat transfer sheet combined with the protective layer, the protective layer was transferred onto the surface of the photograph as obtained above by a heat transfer technique to obtain a card according to the present invention. The protective layer was then removed from the card to retouch the photograph and form another protective layer with lacquer. However, this fact of falsifying came out immediately.

EXAMPLES B2-B5

Heat transfer sheets combined with protective layers were prepared by using the following inks in place of the patterned layer of the heat transfer sheet combined with the protective layer, obtained in Ex. B1. The procedures of Ex. B1 were otherwise repeated to obtain cards according to the present invention.

| Examples | Photosensitive Materials Used | |
|---|---|---|
| B2 | Pink fluorescent dye | 0.05 parts |
| B3 | Fluorescent brightener | 0.01 part |
| B4 | UV absorber | 0.05 parts |
| B5 | IR absorber | 0.05 parts |

The protective layer of the card of Ex. B2 is observed in a pink color by the naked eye, but the protective layers of the cards of Exs. B3-B5 are visually colorless. The protective layer of the card of Ex. B3 glows so clearly with a pale color that it can be distinguishable under black light. The protective layer of the card of Ex. B4 is recognizable in the form of a black shadow under black light, while the card of Ex. B5 can be detected with an infrared detector.

The cards were all difficult to falsify.

EXAMPLE C1

A white core for a card substrate was prepared from a composition consisting of 100 parts of a polyvinyl chloride (with a polymerization degree of 800) compound containing about 10% of additives such as a stabilizer and 15 parts of a white pigment (titanium oxide), said core being 0.2 mm in thickness and measuring 30×30 cm.

Prepared was then a transparent sheet (of 0.15 mm in thickness) consisting of 100 parts of the above-mentioned polyvinyl chloride compound containing 3 parts of a plasticizer and 1 part of a lubricant, which was in turn hot-pressed on each side of the white core to obtain the card substrate used according to this invention.

Inks of three colors, each having the following composition and containing a sublimable dye, were prepared.

Yellow Ink

| | |
|---|---|
| Disperse dye (Macrolex Yellow 6G - C.I. Disperse Yellow 201 by commercialized by Beyer | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 89.0 parts |

Magenta Ink

The same as the above-mentioned yellow ink, except that a magenta disperse dye (C.I. Disperse Red 60) was used as the dye.

Cyan Ink the same as the above-mentioned yellow ink, except that a cyan disperse dye (C.I. Solvent Blue 63) was used as the dye.

A 4.5-$\mu$m thick polyester film was provided, which had been formed on its back side with a heat-resistant slip layer (of 1 $\mu$m in thickness) and on its front side with an adhesion-improving layer (of 0.5 $\mu$m in thickness) formed of a polyurethane type resin. By means of gravure coating, the above-mentioned ink compositions were then repeatedly coated and dried on the front side of that polyester film over a width of 15 cm in a coating amount of about 3 g/m$^2$ in the order of yellow, magenta and cyan, thereby obtaining a heat transfer sheet containing the sublimable dye layers of three colors.

The sublimation heat transfer sheet was then overlaid on the card substrate, and a thermal energy was applied to the assembly with a thermal head connected to electrical signals obtained by the color separation of a photograph of face to effect sublimation transfer in the order of cyan, magenta and yellow, thereby forming a full-colored photograph.

By means of gravure coating, a release layer-forming ink having the following composition was coated and dried in an amount of 1 g/m$^2$ (on solid basis) on the front side of a polyester film similar to the above-mentioned one, thereby forming a release layer.

Release Layer-Forming Ink

| | |
|---|---|
| Acrylic resin | 20 parts |
| Methyl ethyl ketone | 100 parts |
| Toluene | 100 parts |

By means of gravure coating, the following ink was then coated and dried on the front side of the release layer in an amount of about 3 g/m$^2$ to form a hot meltable ink layer, thereby obtaining a hot melting type of heat transfer sheet.

Hot Meltable Ink

| | |
|---|---|
| Acrylic resin + cellulosic resin | 20 parts |
| Carbon black | 10 parts |
| Toluene | 35 parts |

-continued

| | |
|---|---|
| Methyl ethyl ketone | 35 parts |

The heat transfer sheet was overlaid on the blank space of the card on which-. the photographic image had been formed, thereby forming symbolic images such as numerals, characters and other literal images and a bar code.

A 4.5-$\mu$m thick polyester film was provided, which had been formed on its back side with a heat-resistant slip layer and on its front side with an adhesion-improving layer (of 0.1 $\mu$m in thickness) formed of a polyester type resin. By means of gravure coating, a protective layer-forming ink having the following composition was then coated and dried on the front side of that film in an amount of 4 g/m$^2$ (on solid basis), thereby forming a protective layer.

Protective Layer-Forming Ink

| | |
|---|---|
| Acrylic resin (BR-83 commercialized by Mitsubishi Rayon Co., Ltd.) | 20 parts |
| Polyethylene wax | 1 part |
| Methyl ethyl ketone | 50 parts |
| Toluene | 50 parts |

Subsequently, an adhesive layer-forming ink having the following composition was further coated and dried on the protective layer in an amount of 1 g/m$^2$ (on solid basis) to form an adhesive layer, thereby obtaining a heat transfer sheet combined with the protective layer.

Adhesive Layer-Forming Ink

| | |
|---|---|
| Acrylic/vinyl chloride/vinyl acetate copolymer (HS-32G commercialized by Showa Ink Co., Ltd.) | 20 parts |
| Methyl ethyl ketone | 100 parts |
| Toluene | 100 parts |

With the heat transfer sheet combined with the protective layer, the protective layer was then transferred onto the surface of the photograph by a heat transfer technique. In the instant example, however, a printing energy was decreased from a zone to a zone by a 10% decrement to obtain a card according to this invention. The protective layer of this card decreases decrementally in surface gloss from the zone a to the zone e. The protective layer was removed from the card to retouch the photograph and form another protective layer with lacquer. However, the fact of counterfeiting came out immediately.

EXAMPLE C2

In Example C1, the transfer of the protective layer was effected with a hot stamper including a mold notched around it, thereby obtaining such a card according to this invention as sketched in FIG. 12.

EXAMPLE C3

In Example C1, the transfer of the protective layer was carried out three times, as depicted in FIG. 13, thereby obtaining a card according to this invention. The protective layer of this card appears to be uniform by the naked eye, but it is noticeably rough to the touch.

EXAMPLE C4

In Example C1, the transfer of the protective layer was conducted three times, as depicted in FIG. 13, thereby obtaining a card according to this invention. In the instant example, the third cycle of transfer was performed using the heat transfer sheet combined with the protective layer shown in FIG. 15, said protective further containing a fluorescent brightener. The protective layer of this card appears to be uniform by the naked eye. Under black light, however, only the protective layer part, shown at 4", gave out a bright glow.

EXAMPLE C5

After transferring the uniform protective layer in Example C1, a dotted pattern was transferred onto that layer, as shown in FIG. 15, using the heat transfer sheet combined with the protective layer shown in FIG. 15, in which a transparent colored layer was interposed between 0 the protective layer and the release layer, thereby obtaining a card according to this invention.

The above-mentioned cards all made it so difficult to reconstruct their protective layers that they were difficult to falsify.

EXAMPLE D1

Use was made of a transparent type of rainbow hologram sheet commercialized by Dai Nippon Printing Co., Ltd. (of A4 size and 50 μm in thickness). By means of a bar coater, a coating liquid having the following composition was coated and dried on one side of that sheet in an amount of 5.0 g/m² (on dry basis) to obtain a heat transfer image receiving sheet according to this invention.

| | |
|---|---|
| Polyester (Bylon 600 commercialized by Toyobo Co., Ltd.) | 4.0 parts |
| Vinyl chloride/vinyl acetate copolymer (#1000A commercialized by Denki Kagaku Kogyo K.K.) | 6.0 parts |
| Amino-modified silicone (X-22-3050C commercialized by The Shin-Etsu Chemical Co., Ltd.) | 0.2 parts |
| Epoxy-modified silicone (X-22-3000E commercialized by The Shin-Etsu Chemical Co., Ltd.) | 0.2 parts |
| Antioxidant | 0.3 parts |
| Methyl ethyl ketone/toluene (1:1 by weight) | 89.3 parts |

Apart from this, a dye carrying layer-forming ink composition having the following composition was prepared, and was then coated and dried on a 6-μm thick polyethylene terephthalate film in a coating amount of 1.0 g/m² (on dry basis) by means of a wire bar to obtain a heat transfer sheet, said film being subjected on its back side to a heat-resistant treatment.

| | |
|---|---|
| Sublimable dyes (yellow, magenta and cyan) | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 90.0 parts |

The heat transfer sheet of three colors was overlaid on the heat transfer image receiving sheet, while the dye layer was located in opposition to the dye receiving layer. With a thermal sublimation transfer printer (VY-50 commercialized by Hitachi, Ltd.), a printing energy of 90 mJ/mm² was applied through its thermal head to the assembly from the back side of the heat transfer sheet for successive heat transfer, thereby recording in three colors, yellow, cyan and magenta, full-colored photographs, signatures, dates of birth, addresses, names of employers, the name of a country, etc. for six individuals. After a heat-sensitive adhesive was formed on the imagewise surface of the assembly to a thickness of about 5 μm, the assembly was divided into six parts.

A passport form was then provided, on which general items of common information were printed. Applied onto a give region of that form was heat-applied the above-mentioned hologram sheet, thereby preparing six certification cards.

A full-faced viewing of each card gives no holographic image, but provides a clear indication of the general items of common information and the personal items of information. A viewing of each card at an angle of about 45° gave a clear holographic stereogram.

Then, a forced removal of the hologram sheet destroyed partly the dye receiving layer on which the personal information was recorded, leaving one piece of the information on the substrate sheet and another piece on the hologram sheet. It was thus virtually impossible to falsify the photographs, etc.

EXAMPLE E1

A solution of an ethylene/vinyl acetate copolymer was coated and dried on the surface of a transparent type of rainbow hologram sheet commercialized by Dai Nippon Printing Co., Ltd. (which was of A3-size and 50 μm in thickness and bore a landscape) to form an adhesive layer of about 20 μm in thickness, which was in turn applied to a synthetic paper (Yupo FPG#150 commercialized by Oji Yuka Co., Ltd.) to prepare a substrate sheet. Further, a coating liquid having the following composition was coated on the front side of the hologram sheet in an amount Of 10.0 g/m² (on dry basis). After that, it was dried at 100° C. for 30 minutes to obtain a heat transfer image receiving sheet according to this invention.

| | |
|---|---|
| Polyester (Bylon 200 commercialized by Toyobo Co., Ltd.) | 11.5 parts |
| Vinyl chloride/vinyl acetate copolymer (VYHH commercialized by UCC) | 5.0 parts |
| Amino-modified silicone (KF-393C commercialized by The Shin-Etsu Chemical Co., Ltd.) | 1.2 parts |
| Epoxy-modified silicone (X-22-343 commercialized by The Shin-Etsu Chemical Co., Ltd.) | 0.2 parts |
| Methyl ethyl ketone/toluene/cyclohexanone (4:4:2 by weight) | 102.0 parts |

On the other hand, a sublimation type of heat transfer sheet of three colors, yellow, magenta and cyan, was overlaid on the heat transfer sheet, while the dye layer was located in opposition to the dye receiving layer. With a thermal sublimation transfer printer (VY-50 commercialized by Hitachi, Ltd.), a printing energy of 90 mJ/mm² was applied through its thermal head to the assembly from the back side of the heat transfer sheet for successive heat transfer, thereby forming a full-colored portraiture of three colors, yellow, cyan and magenta.

A full-faced viewing of the portraiture gives no holographic image, but provides a clear indication of the heat-transferred image. A viewing of this image at an angle of about 45° gave a clear holographic stereogram against the heat-transferred image.

EXAMPLE E2

In Example E1, the hologram sheet was applied onto the substrate sheet, followed by removal of the support from the hologram sheet. A dye receiving layer similar to that used in Ex. E1 was then formed on the hologram sheet to record a similar image.

A full-faced viewing of that image gives no holographic image, but provides a clear indication of the heat-transferred image. A viewing of the image at an angle of about 45° gave a clear holographic stereogram against the heat-transferred image.

EXAMPLE F1

A solution of an ethylene/vinyl acetate copolymer was coated and dried on the surface of a transparent type of rainbow hologram sheet commercialized by Dai Nippon Printing Co., Ltd. (of A3-size and 50 μm in thickness) to form an adhesive layer of about 20 μm in thickness, thereby obtaining a laminated film according to this invention.

On the other hand, a sublimation type of heat transfer sheet of three colors, yellow, magenta and cyan, was overlaid on a substrate sheet of a hard vinyl chloride resin including a dye receiving layer on its surface, while the dye layer was located in opposition to the dye receiving layer. With a thermal sublimation transfer printer (VY-50 commercialized by Hitachi, Ltd.), a printing energy of 90 mJ/mm$^2$ was applied through its thermal head to the assembly from the back side of the heat transfer sheet for successive heat transfer, thereby recording full-colored photographs of face, signatures, dates of birth, addresses, names of employers, etc. for six individuals.

The laminated film was then thermally applied to the imagewise surface, which was in turn cut into six parts to prepare six ID cards.

A full-faced viewing of each certification card gives no holographic image, but provides a clear indication of the heat-transferred image. A viewing of the card at an angle of about 45° gave a clear holographic stereogram.

A forced removal of the hologram sheet destroyed partly the dye receiving layer that was the image carrier, leaving one piece of the image on the substrate sheet and another piece on the hologram sheet. It was virtually impossible to falsify the photographs, etc.

EXAMPLE G1

A white core for a card substrate was prepared from a composition consisting of 100 parts of a polyvinyl chloride (with a polymerization degree of 800) compound containing about 10% of additives such as a stabilizer and 15 parts of a white pigment (titanium oxide), said core being 0.2 mm in thickness and measuring 30×30 cm.

Prepared was then a transparent sheet (of 0.15 mm in thickness) consisting of 100 parts of the above-mentioned polyvinyl chloride compound containing 3 parts of a plasticizer and 1 part of a lubricant, which was in turn hot-pressed on each side of the white core to obtain a card substrate used according to this invention.

Inks of three colors, each having the following composition and containing a sublimable dye, were prepared.

Yellow Ink

| | |
|---|---|
| Disperse dye (Macrolex Yellow 6G - C.I. Disperse Yellow 201 by commercialized by Beyer) | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 89.0 parts |

The same as the above-mentioned yellow ink, except that a magenta disperse dye (C.I. Disperse Red 60) was used as the dye.

Cyan Ink

The same as the above-mentioned yellow ink, except that a cyan disperse dye (C.I. Solvent Blue 63) was used as the dye.

A 4.5-μm thick polyester film was provided, which had been formed on its back side with a heat-resistant slip layer (of 1 μm in thickness) and on its front side with an adhesion-improving layer (of 0.5 μm in thickness) formed of a polyurethane type resin. By means of gravure coating, the above-mentioned ink compositions were then repeatedly coated and dried on the front side of that polyester film over a width of 15 cm in a coating amount of about 3 g/m$^2$ in the order of yellow, magenta and cyan, thereby obtaining a heat transfer sheet containing the sublimable dye layers of three colors.

With the heat transfer sheet of cyan, a pattern in the form of a fine lattice was formed on the card substrate. The sublimation heat transfer sheet was then overlaid on the card substrate, and a thermal energy was applied to the assembly with a thermal head connected to electrical signals obtained by the color separation of a photograph of face to effect sublimation transfer in the order of cyan, magenta and yellow, thereby forming a full-colored photograph.

By means of gravure coating, a release layer-forming ink having the following composition was coated and dried in an amount of 1 g/m$^2$ (on solid basis) on the front side of a polyester film similar to the above-mentioned one, thereby forming a release layer.

Release Layer-Forming Ink

| | |
|---|---|
| Acrylic resin | 20 parts |
| Methyl ethyl ketone | 100 parts |
| Toluene | 100 parts |

By means of gravure coating, the following ink was coated and dried on the surface of the release layer in an amount of about 3 g/m$^2$ to form a hot meltable ink layer, thereby obtaining a hot melting type of heat transfer sheet.

Hot Meltable Ink

| | |
|---|---|
| Acrylic/vinyl chloride/vinyl acetate copolymer resin | 20 parts |
| Carbon black | 10 parts |
| Toluene | 35 parts |
| Methyl ethyl ketone | 35 parts |

The heat transfer sheet was overlaid on the blank space of the card on which the photographic image had been formed, thereby forming symbolic images such as numerals, characters and other literal images and a bar code.

A 4.5-μm thick polyester film was provided, which had been formed on its back side with a heat-resistant slip layer and on its front side with an adhesion-improving layer (of 0.1 μm in thickness) formed of a polyester type resin. By means of gravure coating, a protective layer-forming ink having the following composition was then coated and dried on the front side of that film in an amount of 4 g/m² (on solid basis), thereby forming a protective layer.

Protective Layer-Forming Ink

| | |
|---|---|
| Acrylic resin (BR-83 commercialized by Mitsubishi Rayon Co., Ltd.) | 20 parts |
| Polyethylene wax | 1 part |
| Methyl ethyl ketone | 50 parts |
| Toluene | 50 parts |

Subsequently, an adhesive layer-forming ink having the following composition was further coated and died on the protective layer in an amount of 1 g/m² (on solid basis) to form an adhesive layer, thereby obtaining a heat transfer sheet combined with the protective layer.

Adhesive Layer-Forming Ink

| | |
|---|---|
| Acrylic/vinyl chloride/vinyl acetate copolymer (HS-32G commercialized by Showa Ink Co., Ltd.) | 20 parts |
| Methyl ethyl ketone | 100 parts |
| Toluene | 100 parts |

With the heat transfer sheet combined with the protective layer, the protective layer was then transferred onto the surface of the photograph as obtained above by a heat transfer technique to obtain a card according to the resent invention.

The protective layer was then removed from the card to retouch the photograph and form another protective layer with lacquer. As a result, the fine pattern was simultaneously destroyed. Since the pattern was difficult to reconstruct, it was virtually impossible to falsify the card.

EXAMPLE G2

In Example G1, the photograph was first formed, followed by the formation of a magenta pattern all over the surface of the card substrate, thereby making a card according to this invention.

EXAMPLE G3

In Example G1, the photograph and pattern were simultaneously formed in non-superposed relation, thereby obtaining a card according to this invention.

The cards of Exs. G2 and G3 were both difficult to falsify.

COMPARATIVE EXAMPLE G1

A latticed pattern (of 2 μm in thickness) was formed all over the surface of the card of Ex. G1 with a blue, ultraviolet curing gravure ink to make a card in similar manners as in Ex. G1. Where the characters defined by the heat melting ink were superposed on the pattern, they become unclear by a transfer failure with the photographic zone being blotted by a failure in fixing the dye. Also, the protective layer failed to show sufficient adhesion.

EXAMPLE H1

A white core for a card substrate was prepared from a composition consisting of 100 parts of a polyvinyl chloride (with a polymerization degree of 800) compound containing about 10% of additives such as a stabilizer and 15 parts of a white pigment (titanium oxide), said core being 0.2 mm in thickness and measuring 30×30 cm.

Prepared was then a transparent sheet (of 0.15 mm in thickness) consisting of 100 parts of the above-mentioned polyvinyl chloride compound containing 3 parts of a plasticizer and 1 part of a lubricant, which was in turn hot-pressed on each side of the white core to obtain a card substrate used according to this invention.

Inks of three colors, each having the following composition and containing a sublimable dye, were prepared.

Yellow Ink

| | |
|---|---|
| Disperse dye (Macrolex Yellow 6G - C.I. Disperse Yellow 201 by commercialized by Beyer) | 5.5 parts |
| Polyvinyl butyral resin (Eslec BX-1 commercialized by Sekisui Chemical Co., Ltd.) | 4.5 parts |
| Methyl ethyl ketone/toluene (1:1 by weight) | 89.0 parts |

Magenta Ink

The same as the above-mentioned yellow ink, except that a magenta disperse dye (C.I. Disperse Red 60) was used as the dye.

Cyan Ink

The same as the above-mentioned yellow ink, except that a cyan disperse dye (C.I. Solvent Blue 63) was used as the dye.

A 4.5-μm thick polyester film was provided, which had been formed on its back side with a heat-resistant slip layer (of 1 μm in thickness) and on its front side with an adhesion-improving layer (of 0.5 μm in thickness) formed of a polyurethane type resin. By means of gravure coating, the above-mentioned ink compositions were then repeatedly coated and dried on the front side of that polyester film over a width of 15 cm in a coating amount of about 3 g/m² in the order of yellow, magenta and cyan, thereby obtaining a heat transfer sheet containing the sublimable dye layers of three colors.

With the heat transfer sheet of cyan, the card substrate was provided all over its surface with a pattern in the form of a fine lattice. The sublimation heat transfer sheet was then overlaid on the card substrate, and a thermal energy was applied to the assembly with a thermal head connected to electrical signals obtained by the color separation of a photograph of face to effect sublimation transfer in the order of cyan, magenta and yellow, thereby forming a full-colored photograph.

By means of gravure coating, a release layer-forming ink having the following composition was coated and dried in an amount of 1 g/m² (on solid basis) on the front side of a polyester film similar to the above-mentioned one, thereby forming a release layer.

Release Layer-Forming Ink

| | |
|---|---|
| Acrylic resin | 20 parts |
| Methyl ethyl ketone | 100 parts |

| | |
|---|---|
| Toluene | 100 parts |

By means of gravure coating, the following ink was coated and dried on the front side of the release layer in a coating amount of about 3 g/m² to form a hot meltable ink layer, thereby obtaining a hot melting type of heat transfer sheet.

Hot Meltable Ink

| | |
|---|---|
| Acrylic/vinyl chloride/vinyl acetate copolymer resin | 20 parts |
| Disperse dye (Macrolex Yellow 6G) | 2 parts |
| Carbon black | 10 parts |
| Toluene | 35 parts |
| Methyl ethyl ketone | 35 parts |

The heat transfer sheet was overlaid on the blank space of the card on which the photographic image had been formed, thereby forming symbolic images such as numerals, characters and other literal images and a bar code.

A 4.5-μm thick polyester film was provided, which had been formed on its back side with a heat-resistant slip layer and on its front side with an adhesion-improving layer (of 0.1 μm in thickness) formed of a polyester type resin. By means of gravure coating, a protective layer-forming ink having the following composition was then coated and dried on the front side of that film in an amount of 4 g/m² (on solid basis), thereby forming a protective layer.

Protective Layer-Forming Ink

| | |
|---|---|
| Acrylic resin (BR-3 commercialized by Mitsubishi Rayon Co., Ltd.) | 20 parts |
| Polyethylene wax | 1 part |
| Methyl ethyl ketone | 50 parts |
| Toluene | 50 parts |

Subsequently, an adhesive layer-forming ink having the following composition was further coated and dried on the protective layer in an amount of 1 g/m² (on solid basis) to form an adhesive layer, thereby obtaining a heat transfer sheet combined with the protective layer.

Adhesive Layer-Forming Ink

| | |
|---|---|
| Acrylic/vinyl chloride/vinyl acetate copolymer (HS-32G commercialized by Showa Ink Co., Ltd.) | 20 parts |
| Methyl ethyl ketone | 100 parts |
| Toluene | 100 parts |

With the heat transfer sheet combined with the protective layer, the protective layer was then transferred onto the imagewise surface of the photograph as obtained above by a heat transfer technique to obtain a card according to the present invention.

The protective layer was removed from the card to retouch the photograph. As a result, the fine pattern was simultaneously destroyed. Since this pattern was difficult to reconstruct, it was virtually impossible to falsify the card.

EXAMPLE H2

In Example H1, a magenta disperse dye (C.I. Disperse Red 60) was used as the dye. Otherwise, the procedures of Ex. H1 were repeated to make a heat transfer sheet and card according to this invention.

EXAMPLE H3

In Example H1, a cyan disperse dye (C.I. Solvent Blue 63) was used as the dye. Otherwise, the procedure of Ex. H1 were repeated to make a heat transfer sheet and card according to this invention.

The cards of Exs. H2 and H3 were both difficult to falsify.

COMPARATIVE EXAMPLE H1

Without using the disperse dye in Example H1, a heat melting heat transfer sheet was prepared. Scratching off the ink characters printed similarly left nothing behind Thus, an attempt to falsify the card with another characters would be not found out immediately.

INDUSTRIAL APPLICABILITY

The heat transfer recording media according to the present invention, which provide greater security against falsifying and counterfeiting, have wide applications as various cards inclusive of identification cards, driving licenses and membership cards.

We claim:

1. A heat transfer recording medium comprising:
   a substrate having items of information recorded on a surface thereof by heat transfer wherein said substrate includes an its surface a background pattern, an image and literal information, said background pattern and image printed by a heat transfer technique; and
   means for providing security against counterfeiting comprising a transparent protective layer provided on at least a portion of the thus recorded surface of said substrate, said protective layer including a design layer therein or thereon which does not substantially conceal said information, said design layer comprising at least one number selected from the group consisting of a transparent pigment, a dye, a fluorescent dye, an infrared absorber, a fluorescent brightener, an ultraviolet absorber, and an oxygen indicator.

2. The heat transfer recording medium of claim 1, wherein said substrate is in the form of a card.

3. The heat transfer recording medium of claim 1, wherein said design layer formed on or in said protective layer is visually observable in a normal state.

4. The heat transfer recording medium of claim 1, wherein said design layer formed on or in said protective layer is not visually observable in a normal state.

5. The heat transfer recording medium of claim 1, wherein said protective layer comprises layers between which said design layer is formed.

6. The heat transfer recording medium of claim 1, further comprising an adhesive layer formed between said substrate and said transparent protective layer, and said design layer is formed between said adhesive layer and said transparent protective layer.

7. A heat transfer recording medium comprising:
   a substrate having items of information recorded on a surface thereof by heat transfer;
   a transparent protective layer provided on at least a portion of the thus recorded surface of said substrate; and
   an adhesive layer formed between said substrate and said transparent protective layer, wherein said adhesive layer provides means for providing security against counterfeiting, wherein said adhesive layer contains a photosensitive material which does not substantially conceal said information.

8. The heat transfer recording medium of claim 7, wherein said photosensitive material comprises at least one member selected from the group consisting of a transparent pigment, a dye, a fluorescent dye, an infrared absorber, a fluorescent brightener, and an ultraviolet absorber.

9. A heat transfer recording medium comprising:
a substrate having items of information recorded on a surface thereof by heat transfer; and
means for providing security against counterfeiting comprising a transparent protective layer provided on at least a portion of the thus recorded surface of said substrate, said transparent protective layer containing a photosensitive material which does not substantially conceal said information.

10. The heat transfer recording medium of claim 9, wherein said photosensitive material comprises at least one member selected from the group consisting of a transparent pigment, a dye, a fluorescent dye, an infrared absorber, a fluorescent brightener, and an ultraviolet absorber.

11. A heat transfer recording medium comprising:
a substrate having items of information recorded on a surface thereof by heat transfer; and
means for providing security against counterfeiting comprising a transparent protective layer provided on at least a portion of the thus recorded surface of said substrate through an adhesive layer, said transparent protective layer comprising an uneven layer.

12. The heat transfer recording medium of claim 11, wherein said uneven layer comprises at least one of an uneven luster, an uneven profile, an uneven thickness, an uneven surface form, and an uneven coloration.

* * * * *